US012659091B2

(12) United States Patent     (10) Patent No.:   US 12,659,091 B2

Wei et al.              (45) Date of Patent:     Jun. 16, 2026

(54) DATA TRANSMISSION METHOD AND APPARATUS

(71) Applicant: HUAWEI TECHNOLOGIES CO., LTD., Shenzhen (CN)

(72) Inventors: Fan Wei, Shenzhen (CN); Lei Wang, Shanghai (CN); Xiuqiang Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 354 days.

(21) Appl. No.: 18/413,128

(22) Filed: Jan. 16, 2024

(65) Prior Publication Data

US 2024/0154740 A1     May 9, 2024

Related U.S. Application Data

(63) Continuation of application No. PCT/CN2022/100521, filed on Jun. 22, 2022.

(30) Foreign Application Priority Data

Jul. 19, 2021    (CN) .......................... 202110812037.4

(51) Int. Cl.
    *H04L 5/00*        (2006.01)
    *H04L 27/26*      (2006.01)

(52) U.S. Cl.
    CPC ........ *H04L 5/0012* (2013.01); *H04L 27/2605* (2013.01)

(58) Field of Classification Search
    CPC ...... H04B 1/713; H04B 1/7143; H04B 1/715; H04J 11/0026; H04L 27/2605; H04L 5/0012

(Continued)

(56) References Cited

U.S. PATENT DOCUMENTS

2004/0081226 A1*   4/2004   Park ..................... H04B 1/7143
                                   375/E1.035
2013/0322493 A1* 12/2013   Jersenius .......... H04W 72/0453
                                      375/133

(Continued)

FOREIGN PATENT DOCUMENTS

CN       104219772 A    12/2014
EP        3553991 A1    10/2019

OTHER PUBLICATIONS

Extended European Search Report issued in corresponding European Application No. 22845071.4, dated Oct. 2, 2024, pp. 1-11.

(Continued)

*Primary Examiner* — Robert J Lopata
(74) *Attorney, Agent, or Firm* — HAUPTMAN HAM, LLP

(57) ABSTRACT

A data transmission method includes obtaining a first sequence, determining a first element in the first sequence, and performing data transmission with a network device in one frequency hopping cycle based on a frequency corresponding to an element in the first sequence. The first sequence includes Q elements that correspond to Q different frequencies. Q is a positive integer greater than 1. A first frequency corresponding to a first terminal device at a first frequency hopping moment, and corresponding to the first element. A second frequency corresponding to the first terminal device at an $i^{th}$ frequency hopping moment, and corresponding to a second element obtained by cyclically moving from the first element in a left or right direction for i−1 times according to a specified rule, and i is a positive integer from 2 to M, and M is a positive integer greater than or equal to 2.

20 Claims, 5 Drawing Sheets

(58) Field of Classification Search
USPC ........................................................ 370/329
See application file for complete search history.

(56) References Cited

U.S. PATENT DOCUMENTS

| | | | | |
|---|---|---|---|---|
| 2017/0222770 A1* | 8/2017 | Liu | ...................... | H04B 1/7143 |
| 2017/0223743 A1* | 8/2017 | Lin | ...................... | H04B 1/7143 |
| 2017/0303275 A1* | 10/2017 | Banerjea | ................ | H04B 1/713 |
| 2018/0069593 A1* | 3/2018 | Yi | ........................... | H04L 5/003 |
| 2019/0053229 A1* | 2/2019 | Kim | ................. | H04W 72/0446 |
| 2020/0204327 A1* | 6/2020 | Jia | ..................... | H04W 72/0453 |
| 2020/0280338 A1* | 9/2020 | Matsumura | ............ | H04B 1/713 |
| 2021/0075579 A1* | 3/2021 | Liu | ....................... | H04L 5/0098 |
| 2021/0250946 A1* | 8/2021 | Utkovski | .............. | H04L 5/0026 |
| 2023/0223985 A1* | 7/2023 | Rastegardoost | ..... | H04B 1/7143 |
| | | | | 375/132 |
| 2024/0040554 A1* | 2/2024 | Liu | ................... | H04W 72/0457 |
| 2024/0146472 A1* | 5/2024 | Herath | ................ | H04B 1/7143 |
| 2024/0187188 A1* | 6/2024 | Jacobsson | .......... | H04L 27/2613 |

OTHER PUBLICATIONS

Huawei, HiSilicon:"Enhanced UL configured grant transmissions."
3GPP TSG RAN WG1 Meeting #96, Athens, Greece, Feb. 25-Mar.
1, 2019. R1-1901562, total 16 pages.
3rd Generation Partnership Project; Technical Specification Group
Radio Access Network; NR; Physical layer procedures for data
(Release 16). 3GPP TS 38.214 V16.6.0 (Jun. 2021). total 172 pages.
International Search Report issued in corresponding International
Application No. PCT/CN2022/100521, dated Aug. 16, 2022, pp.
1-10.

* cited by examiner

| T1 | F1 | F2 | F3 | F4 | F5 | F6 |
|---|---|---|---|---|---|---|
| T2 | F2 | F3 | F4 | F5 | F6 | F1 |
| T3 | F3 | F4 | F5 | F6 | F1 | F2 |
| T4 | F4 | F5 | F6 | F1 | F2 | F3 |
| ... | ... | ... | ... | ... | ... | ... |

| User/Moment | UE 1 | UE 2 | UE 3 | UE 4 | UE 5 | UE 6 |
|---|---|---|---|---|---|---|
| T1 | F1 | F2 | F3 | F4 | F5 | F6 |
| T2 | F6 | F1 | F2 | F3 | F4 | F5 |
| T3 | F5 | F6 | F1 | F2 | F3 | F4 |
| T4 | F4 | F5 | F6 | F1 | F2 | F3 |
| ... | ... | ... | ... | ... | ... | ... |

| User/Moment | UE 7 | UE 8 | UE 9 | UE 10 | UE 11 | UE 12 |
|---|---|---|---|---|---|---|
| T1 | F3 | F1 | F4 | F6 | F2 | F5 |
| T2 | F5 | F3 | F1 | F4 | F6 | F2 |
| T3 | F2 | F5 | F3 | F1 | F4 | F6 |
| T4 | F6 | F2 | F5 | F3 | F1 | F4 |
| ... | ... | ... | ... | ... | ... | ... |

| User/Moment | UE 13 | UE 14 | UE 15 | UE 16 | UE 17 | UE 18 |
|---|---|---|---|---|---|---|
| T1 | F5 | F6 | F2 | F1 | F4 | F3 |
| T2 | F3 | F5 | F6 | F2 | F1 | F4 |
| T3 | F4 | F3 | F5 | F6 | F1 | F2 |
| T4 | F2 | F4 | F3 | F5 | F6 | F1 |
| ... | ... | ... | ... | ... | ... | ... |
FIG. 6C
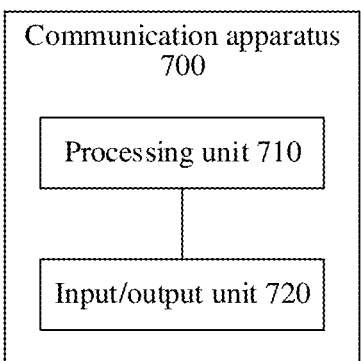
FIG. 7
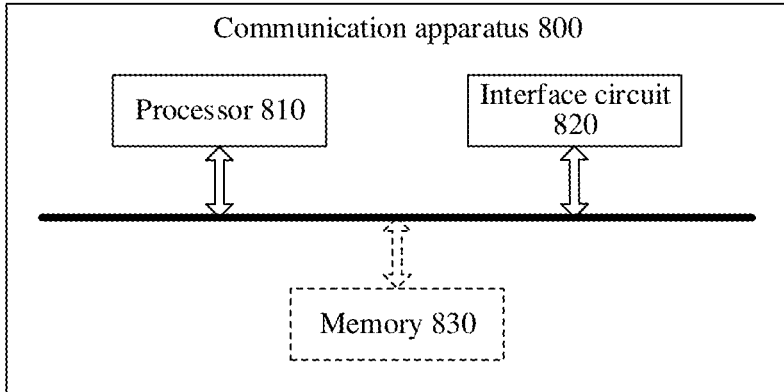
FIG. 8

DATA TRANSMISSION METHOD AND APPARATUS

CROSS-REFERENCE TO RELATED APPLICATIONS

This application is a continuation of International Application No. PCT/CN2022/100521, filed on Jun. 22, 2022, which claims priority to Chinese Patent Application No. 202110812037.4, filed on Jul. 19, 2021, the disclosures of the aforementioned applications are hereby incorporated by reference in their entireties.

TECHNICAL FIELD

The present application relates to the field of communication technologies, and in particular, to a data transmission method and apparatus.

BACKGROUND

In a wireless communication system, multi-user sharing resources such as time domain resources, frequency domain resources, and space domain resources should be taken into special consideration. Existing systems such as long term evolution (LTE) and new radio (NR) use an orthogonal multiple access mode to allocate resources such as time domain resources, frequency domain resources, and space domain resources to users, so that each user can exclusively occupy a frequency domain resource, a time domain resource, or a space domain resource. Thanks to the ubiquity of applications such as the Internet of Things, the quantity of users accessing wireless networks will see an exponential increase. In a case of limited communication resources such as a spectrum, a non-orthogonal multiple access mode needs to be considered, that is, multiple users share a same resource such as a time domain resource, a frequency domain resource, or a space domain resource in a communication process.

In non-orthogonal multiple access, users share a same communication resource. To resolve a problem of inter-user interference (that is, multiple access interference), a frequency hopping mechanism is introduced in a communication system. To be specific, a user selects a different frequency band in each transmission to randomize the inter-user interference, to resolve the multiple access interference problem in non-orthogonal multiple access. In specific implementation, receiving and sending parties in a communication process agree on a frequency hopping pattern in advance, and synchronously perform hopping according to the frequency hopping pattern. The frequency hopping pattern reflects a regularity of signal carrier frequencies of both communication parties.

However, a design rule for the frequency hopping pattern in the technologies of some approaches is relatively simple. When a relatively large quantity of users access a network, a large quantity of interfering users exist on each frequency, and the multiple access interference problem exists.

SUMMARY

One or more embodiments of the present application provide a data transmission method and apparatus, to resolve a multiple access interference problem in a multi-user communication system.

According to a first aspect, a data transmission method is provided. The method may be applied to a terminal device or a chip in the terminal device. For example, the method is applied to a first terminal device. The first terminal device obtains a first sequence, where the first sequence includes Q elements, the Q elements correspond to Q different frequencies, and Q is a positive integer greater than 1. The first terminal device determines a first element in the first sequence. In one frequency hopping cycle, the first terminal device performs data transmission with a network device based on a frequency corresponding to an element in the first sequence, where the one frequency hopping cycle includes M frequency hopping moments, a frequency corresponding to the first terminal device at a first frequency hopping moment is a frequency corresponding to the first element, a frequency corresponding to the first terminal device at an $i^{th}$ frequency hopping moment is a frequency corresponding to an element obtained by cyclically moving from the first element leftward (or rightward) for i−1 times according to a specified rule, i is a positive integer from 2 to M, and M is a positive integer greater than or equal to 2.

In some embodiments, the first terminal device may have a plurality of (for example, more than two) frequency hopping moments in the one frequency hopping cycle in time domain, and may support a plurality of (for example, more than two) optional frequency hopping frequencies in frequency domain, thereby resolving a multiple access interference problem in a multi-user communication system.

In some embodiments, the first sequence is one of a plurality of candidate sequences, the plurality of candidate sequences are in a one-to-one correspondence with a plurality of terminal device groups, the first terminal device is located in a first terminal device group in the plurality of terminal device groups, and a quantity of same elements at a same relative position in any two sequences in the plurality of candidate sequences does not exceed a preset quantity. In the foregoing one frequency hopping cycle, each terminal device in each terminal device group may perform data transmission with the network device based on a frequency corresponding to an element in a candidate sequence corresponding to the terminal device group.

For example, in the foregoing one frequency hopping cycle, a second terminal device further performs data transmission with the network device based on a frequency corresponding to an element in a second sequence, where the second sequence is a sequence in the plurality of candidate sequences other than the first sequence, the second terminal device is located in a second terminal device group in the plurality of terminal device groups, and the second terminal device group is different from the first terminal device group.

In this way, a plurality of terminal devices can share a same communication resource while ensuring that frequency hopping patterns corresponding to any two terminal devices in a same terminal device group are orthogonal to each other, and a maximum quantity of collision times of frequency hopping patterns corresponding to any two terminal devices in different terminal device groups does not exceed d, thereby further improving reliability of the communication system.

In some embodiments, the specified rule may include: Starting from the first element, each element is cyclically moved leftward or rightward in turn.

In some embodiments, the first terminal device randomly selects one sequence in the plurality of candidate sequences as the first sequence.

In some embodiments, the first terminal device receives information about a first indication from the network device, where the first indication indicates one sequence in the plurality of candidate sequences. The first terminal device determines the one sequence in the plurality of candidate sequences as the first sequence based on the first indication.

In some embodiments, the first terminal device receives the first sequence from the network device, where the first sequence is one of the plurality of candidate sequences.

In some embodiments, the plurality of candidate sequences are specified in a protocol.

In this way, implementation complexity of the network device or the terminal device can be reduced.

In some embodiments, the plurality of candidate sequences are configured by the network device, or the plurality of candidate sequences are pre-agreed on by the network device and the first terminal device.

In this way, a candidate sequence can be flexibly configured based on an actual transmission scenario, thereby improving flexibility and reliability of data transmission.

In some embodiments, the first terminal device may receive information about a second indication from the network device, where the second indication indicates one element in the Q elements in the first sequence, and determine, from the Q elements in the first sequence, the one element as the first element based on the second indication.

In this way, the network device can configure the first element for the first terminal device, to improve communication reliability.

In some embodiments, the first terminal device may receive a third indication from the network device, where the third indication includes the information about the first indication and the information about the second indication.

In this way, signaling overheads can be reduced.

In some embodiments, when Q=6, the candidate sequence may include one or more of the following:
{F1, F2, F3, F4, F5, F6};
{F3, F1, F4, F6, F2, F5};
{F2, F1, F3, F4, F6, F5};
{F3, F1, F2, F5, F6, F4};
{F4, F2, F6, F3, F5, F1};
{F5, F6, F2, F1, F4, F3};
{F6, F4, F1, F3, F5, F2};
{F2, F5, F4, F6, F1, F3};
{F6, F3, F1, F5, F2, F4};
{F3, F1, F6, F4, F5, F2};
{F3, F6, F4, F2, F5, F1};
{F2, F1, F5, F6, F3, F4};
{F4, F5, F1, F6, F3, F2};
{F4, F1, F6, F2, F3, F5};
{F5, F3, F4, F1, F2, F6};
{F4, F1, F5, F3, F6, F2};
{F5, F4, F3, F2, F1, F6};
{F1, F2, F4, F3, F6, F5};
{F5, F4, F2, F3, F6, F1}; and
{F2, F6, F1, F4, F5, F3}.
F1, F2, F3, F4, F5, and F6 represent six different frequencies. Correspondingly, the first sequence is any sequence in the foregoing 20 candidate sequences, or the first sequence is obtained by performing cyclic shifts on any sequence in the foregoing 20 candidate sequences.

In some embodiments, when Q=8, the candidate sequence may include one or more of the following:
{F1, F2, F3, F4, F5, F6, F7, F8};
{F3, F5, F8, F1, F6, F7, F2, F4};
{F5, F1, F7, F2, F8, F4, F6, F3};
{F3, F7, F2, F5, F1, F8, F6, F4};
{F3, F1, F6, F5, F8, F7, F4, F2};
{F6, F4, F1, F8, F3, F2, F7, F5};
{F5, F7, F3, F1, F4, F2, F6, F8};

4

{F2, F7, F1, F5, F3, F6, F4, F8};
{F5, F4, F2, F8, F7, F3, F6, F1};
{F2, F8, F3, F1, F5, F7, F4, F6};
{F5, F7, F1, F2, F6, F3, F8, F4};
{F1, F3, F2, F4, F7, F8, F5, F6};
{F2, F5, F3, F7, F1, F6, F8, F4};
{F4, F3, F2, F1, F8, F7, F6, F5};
{F4, F1, F6, F2, F3, F5, F7, F8};
{F2, F6, F7, F1, F3, F4, F8, F5};
{F3, F6, F2, F1, F7, F5, F4, F8};
{F6, F8, F1, F5, F2, F7, F3, F4};
{F6, F2, F7, F4, F8, F1, F3, F5};
{F1, F2, F4, F6, F7, F3, F8, F5};
{F1, F3, F8, F2, F6, F4, F7, F5};
{F6, F1, F2, F7, F8, F3, F5, F4};
{F3, F8, F7, F2, F1, F6, F4, F5};
{F5, F2, F3, F6, F8, F7, F1, F4};
{F4, F1, F3, F7, F5, F8, F6, F2};
{F3, F8, F1, F4, F6, F5, F7, F2};
{F5, F3, F4, F2, F7, F6, F1, F8};
{F3, F2, F8, F6, F5, F1, F4, F7};
{F8, F2, F4, F5, F1, F6, F3, F7};
{F1, F8, F4, F7, F2, F6, F5, F3};
{F3, F4, F7, F1, F8, F2, F5, F6};
{F5, F7, F6, F8, F3, F4, F1, F2};
{F3, F2, F5, F4, F1, F7, F8, F6};
{F4, F5, F8, F2, F1, F3, F6, F7};
{F7, F5, F2, F1, F4, F3, F8, F6};
{F2, F5, F8, F4, F3, F1, F7, F6};
{F8, F5, F4, F7, F6, F3, F1, F2};
{F7, F4, F3, F6, F5, F2, F8, F1};
{F2, F6, F1, F4, F8, F7, F5, F3};
{F4, F1, F5, F6, F8, F2, F3, F7};
{F5, F8, F3, F7, F6, F4, F2, F1}; and
{F8, F6, F1, F7, F3, F5, F2, F4}.
F1, F2, F3, F4, F5, F6, F7, and F8 represent eight different frequencies. Correspondingly, the first sequence is any sequence in the foregoing 42 candidate sequences, or the first sequence is obtained by performing cyclic shifts on any sequence in the foregoing 42 candidate sequences.

According to a second aspect, a frequency hopping transmission method is provided. The method may be applied to a network device or a chip in the network device. For example, the method is applied to the network device, and the method includes: The network device obtains a first sequence, where the first sequence includes Q elements, the Q elements correspond to Q different frequencies, and Q is a positive integer greater than 1. The network device determines a first element in the first sequence. In one frequency hopping cycle, the network device performs data transmission with a first terminal device based on a frequency corresponding to an element in the first sequence, where the one frequency hopping cycle includes M frequency hopping moments, a frequency corresponding to the first terminal device at a first frequency hopping moment is a frequency corresponding to the first element, a frequency corresponding to the first terminal device at an $i^{th}$ frequency hopping moment is a frequency corresponding to an element obtained by cyclically moving from the first element leftward (or rightward) for i−1 times according to a specified rule, i is a positive integer from 2 to M, and M is a positive integer greater than or equal to 2.

In some embodiments, the first sequence is one of a plurality of candidate sequences, the plurality of candidate sequences are in a one-to-one correspondence with a plurality of terminal device groups, the first terminal device is located in a first terminal device group in the plurality of terminal device groups, and a quantity of same elements at a same relative position in any two sequences in the plurality of candidate sequences does not exceed a preset quantity. In the one frequency hopping cycle, the network device further performs data transmission with a second terminal device based on a frequency corresponding to an element in a second sequence, where the second sequence is a sequence in the plurality of candidate sequences other than the first sequence, the second terminal device is located in a second terminal device group in the plurality of terminal device groups, and the second terminal device group is different from the first terminal device group.

In some embodiments, the specified rule includes: Starting from the first element, each element is cyclically moved leftward or rightward in turn.

In some embodiments, the network device may determine one sequence in the plurality of candidate sequences as the first sequence. The method further includes: The network device sends information about a first indication to the first terminal device, where the first indication indicates the one sequence in the plurality of candidate sequences, or the network device sends the one sequence to the first terminal device.

In some embodiments, the plurality of candidate sequences are specified in a protocol, or the plurality of candidate sequences are configured by the network device, or the plurality of candidate sequences are pre-agreed on by the network device and the first terminal device.

In some embodiments, the network device may further send information about a second indication to the first terminal device, where the second indication indicates the first element in the Q elements in the first sequence.

In some embodiments, the network device may further send a third indication to the first terminal device, where the third indication includes the information about the first indication and the information about the second indication.

In some embodiments, Q=6, and the first sequence is any one of the following sequences, or the first sequence is obtained by performing cyclic shifts on any one of the following sequences:

{F1, F2, F3, F4, F5, F6};
{F3, F1, F4, F6, F2, F5};
{F2, F1, F3, F4, F6, F5};
{F3, F1, F2, F5, F6, F4};
{F4, F2, F6, F3, F5, F1};
{F5, F6, F2, F1, F4, F3};
{F6, F4, F1, F3, F5, F2};
{F2, F5, F4, F6, F1, F3};
{F6, F3, F1, F5, F2, F4};
{F3, F1, F6, F4, F5, F2};
{F3, F6, F4, F2, F5, F1};
{F2, F1, F5, F6, F3, F4};
{F4, F5, F1, F6, F3, F2};
{F4, F1, F6, F2, F3, F5};
{F5, F3, F4, F1, F2, F6};
{F4, F1, F5, F3, F6, F2};
{F5, F4, F3, F2, F1, F6};
{F1, F2, F4, F3, F6, F5};
{F5, F4, F2, F3, F6, F1}; and
{F2, F6, F1, F4, F5, F3}.

F1, F2, F3, F4, F5, and F6 represent six different frequencies.

In some embodiments, Q=8, and the first sequence is any one of the following sequences, or the first sequence is obtained by performing cyclic shifts on any one of the following sequences:

{F1, F2, F3, F4, F5, F6, F7, F8};
{F3, F5, F8, F1, F6, F7, F2, F4};
{F5, F1, F7, F2, F8, F4, F6, F3};
{F3, F7, F2, F5, F1, F8, F6, F4};
{F3, F1, F6, F5, F8, F7, F4, F2};
{F6, F4, F1, F8, F3, F2, F7, F5};
{F5, F7, F3, F1, F4, F2, F6, F8};
{F2, F7, F1, F5, F3, F6, F4, F8};
{F5, F4, F2, F8, F7, F3, F6, F1};
{F2, F8, F3, F1, F5, F7, F4, F6};
{F5, F7, F1, F2, F6, F3, F8, F4};
{F1, F3, F2, F4, F7, F8, F5, F6};
{F2, F5, F3, F7, F1, F6, F8, F4};
{F4, F3, F2, F1, F8, F7, F6, F5};
{F4, F1, F6, F2, F3, F5, F7, F8};
{F2, F6, F7, F1, F3, F4, F8, F5};
{F3, F6, F2, F1, F7, F5, F4, F8};
{F6, F8, F1, F5, F2, F7, F3, F4};
{F6, F2, F7, F4, F8, F1, F3, F5};
{F, F2, F4, F6, F7, F3, F8, F5};
{F, F3, F8, F2, F6, F4, F7, F5};
{F6, F1, F2, F7, F8, F3, F5, F4};
{F3, F8, F7, F2, F1, F6, F4, F5};
{F5, F2, F3, F6, F8, F7, F1, F4};
{F4, F1, F3, F7, F5, F8, F6, F2};
{F3, F8, F1, F4, F6, F5, F7, F2};
{F5, F3, F4, F2, F7, F6, F1, F8};
{F3, F2, F8, F6, F5, F1, F4, F7};
{F8, F2, F4, F5, F1, F6, F3, F7};
{F, F8, F4, F7, F2, F6, F5, F3};
{F3, F4, F7, F1, F8, F2, F5, F6};
{F5, F7, F6, F8, F3, F4, F1, F2};
{F3, F2, F5, F4, F1, F7, F8, F6};
{F4, F5, F8, F2, F1, F3, F6, F7};
{F7, F5, F2, F1, F4, F3, F8, F6};
{F2, F5, F8, F4, F3, F1, F7, F6};
{F8, F5, F4, F7, F6, F3, F1, F2};
{F7, F4, F3, F6, F5, F2, F8, F1};
{F2, F6, F1, F4, F8, F7, F5, F3};
{F4, F1, F5, F6, F8, F2, F3, F7};
{F5, F8, F3, F7, F6, F4, F2, F1}; and
{F8, F6, F1, F7, F3, F5, F2, F4}.

F1, F2, F3, F4, F5, F6, F7, and F8 represent eight different frequencies.

For beneficial effects of the second aspect and any implementation of the second aspect, refer to beneficial effects of the first aspect and corresponding implementations in the first aspect. Details are not described herein again.

According to a third aspect, a communication apparatus is provided. The apparatus may be, for example, a first terminal device or a chip disposed in the first terminal device. The apparatus includes a module/unit configured to perform the method according to the foregoing first aspect or any possible implementation in the first aspect.

For example, the apparatus may include:

a processing unit, configured to obtain a first sequence, where the first sequence includes Q elements, the Q elements correspond to Q different frequencies, and Q is a positive integer greater than 1, and determine a first element in the first sequence; and an input/output unit, configured to perform data transmission with a network device in one frequency hopping cycle based on a frequency corresponding to an element in the first sequence, where the one frequency hopping cycle includes M frequency hopping moments, a frequency corresponding to the apparatus at a first frequency hopping moment is a frequency corresponding to the first element, a frequency corresponding to the apparatus at an $i^{th}$ frequency hopping moment is a frequency corresponding to an element obtained by cyclically moving from the first element leftward (or rightward) for i−1 times according to a specified rule, i is a positive integer from 2 to M, and M is a positive integer greater than or equal to 2.

According to a fourth aspect, a communication apparatus is provided. The apparatus may be, for example, a network device or a chip disposed in the network device. The apparatus includes a module/unit configured to perform the method according to the foregoing second aspect or any possible implementation in the second aspect.

For example, the apparatus may include:

a processing unit, configured to obtain a first sequence, where the first sequence includes Q elements, the Q elements correspond to Q different frequencies, and Q is a positive integer greater than 1, and determine a first element in the first sequence; and an input/output unit, configured to perform data transmission with a first terminal device in one frequency hopping cycle based on a frequency corresponding to an element in the first sequence, where the one frequency hopping cycle includes M frequency hopping moments, a frequency corresponding to the first terminal device at a first frequency hopping moment is a frequency corresponding to the first element, a frequency corresponding to the first terminal device at an $i^{th}$ frequency hopping moment is a frequency corresponding to an element obtained by cyclically moving from the first element leftward (or rightward) for i−1 times according to a specified rule, i is a positive integer from 2 to M, and M is a positive integer greater than or equal to 2.

According to a fifth aspect, a communication apparatus is provided. The apparatus may include a processor and an interface circuit, where the interface circuit is configured to receive a signal from another communication apparatus other than the communication apparatus and transmit the signal to the processor, or send a signal from the processor to another communication apparatus other than the communication apparatus, and the processor is configured to implement the method according to the first aspect or any possible implementation in the first aspect or the method according to the second aspect or any possible implementation in the second aspect by using a logic circuit or by executing code instructions.

According to a sixth aspect, a computer-readable storage medium is provided, including a program or instructions. When the program or the instructions are run on a computer, the method according to the first aspect or any possible implementation in the first aspect or the method according to the second aspect or any possible implementation in the second aspect is performed.

According to a seventh aspect, a computer program product is provided. When the computer program product runs on a computer, the method according to the first aspect or any possible implementation in the first aspect or the method according to the second aspect or any possible implementation in the second aspect is performed.

According to an eighth aspect, a communication system is provided. The communication system includes a network device and a terminal device, where the terminal device is configured to perform the method according to the first aspect or any possible implementation in the first aspect, and the network device is configured to perform the method according to the second aspect or any possible implementation in the second aspect.

BRIEF DESCRIPTION OF DRAWINGS

FIG. 6C is a schematic diagram of performing cyclic shifts on a third candidate sequence;

FIG. 7 is a schematic diagram of a structure of a communication apparatus according to an embodiment of this application; and FIG. 8 is a schematic diagram of a structure of another communication apparatus according to an embodiment of this application.

DETAILED DESCRIPTION

Figures 1, 2:
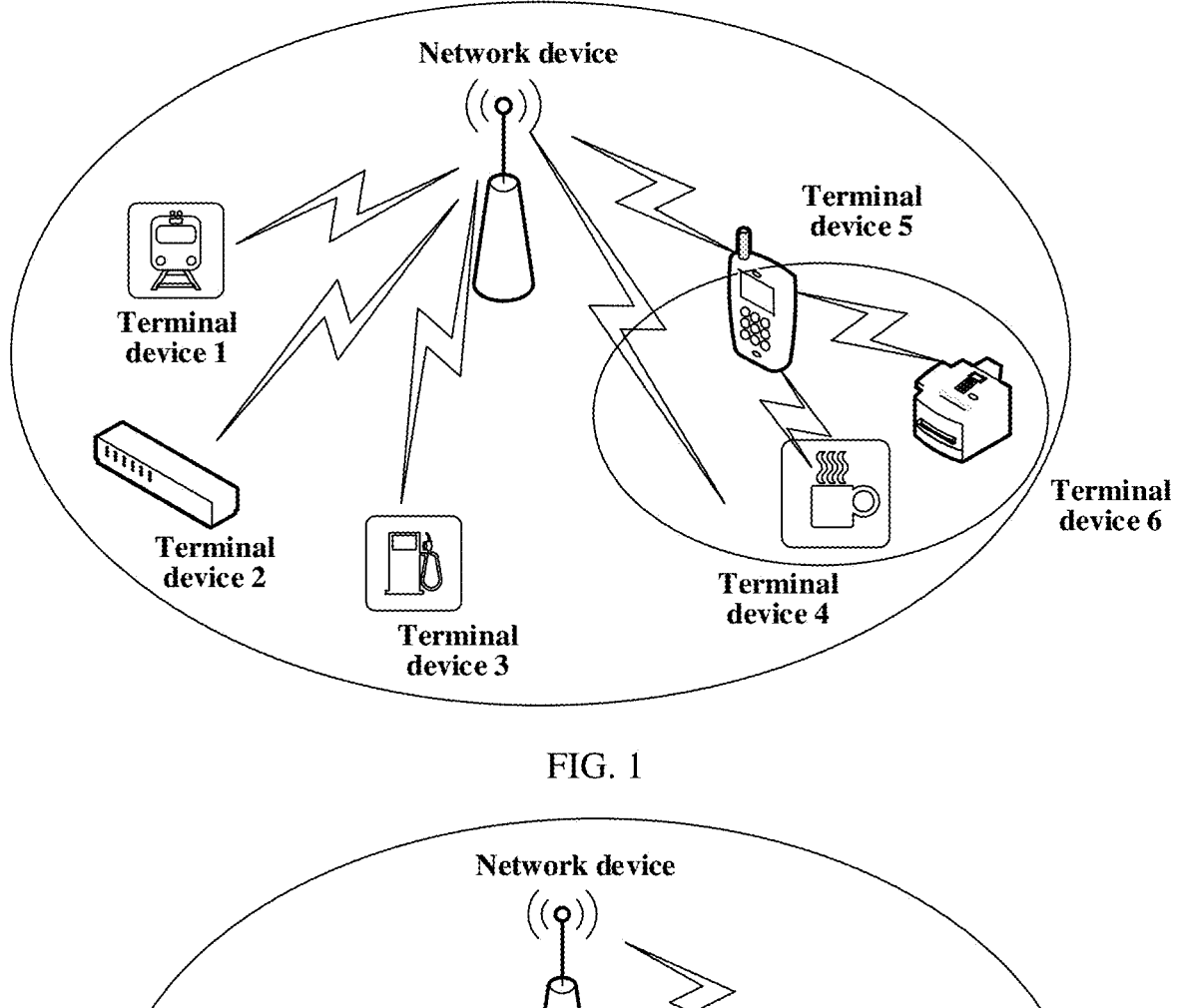
FIG. 1 is a diagram of a network architecture of a communication system to which an embodiment of this application is applicable.
FIG. 2 is a diagram of a network architecture of another communication system to which an embodiment of this application is applicable.

To make objectives, technical solutions, and advantages of embodiments of this application clearer, the following further describes embodiments of this application in detail with reference to the accompanying drawings.

In the 3rd generation partnership project (3GPP) technical specification (TS) 38.214 protocol, a frequency hopping pattern design solution is provided. The solution supports the following two frequency hopping modes:

(1) Intra-slot frequency hopping is applied to a single-slot or multi-slot physical uplink shared channel (PUSCH) transmission scenario. A start resource block (RB) position of each frequency hopping may be calculated according to the following formula:

$$RB_{start} = \begin{cases} RB_{start} & i = 0 \\ (RB_{start} + RB_{offset}) \bmod N_{BWP}^{size} & i = 1 \end{cases}$$

i=0 and i=1 respectively represent a first frequency hopping moment and a second frequency hopping moment, $RB_{start}$ is a start RB position of an uplink bandwidth part (BWP), $RB_{offset}$ represents a frequency domain offset between two frequency hops, and $$N_{BWP}^{size}$$

is a quantity of RBs occupied by a communication bandwidth.

(2) Inter-slot frequency hopping is applied to a multi-slot PUSCH transmission scenario. For the inter-slot frequency hopping, a start RB position of a slot $$n_s^\mu$$

may be calculated according to the following formula:

$$RB_{start}(n_s^\mu) = \begin{cases} RB_{start} & n_s^\mu \bmod 2 = 0 \\ (RB_{start} + RB_{offset})\bmod N_{BWP}^{size} & n_s^\mu \bmod 2 = 1 \end{cases}$$

$$n_s^\mu$$

is a current slot number in a radio frame, $RB_{start}$ is a start RB position of an uplink bandwidth part, $RB_{offset}$ represents a frequency domain offset between two frequency hops, $$N_{BWP}^{size}$$

is a quantity of RBs occupied by a communication bandwidth, and $$RB_{start}(n_s^\mu)$$

is the start RB position of the slot $$n_s^\mu.$$

It can be seen that, regardless of the intra-slot frequency hopping or the inter-slot frequency hopping, in one frequency hopping cycle, there are only two frequency hopping moments in time domain, and only two optional frequency hopping frequencies are supported in frequency domain. When a relatively large quantity of users access a network, a large quantity of interfering users exist on each frequency. Therefore, an existing frequency hopping transmission solution has a relatively limited capability of addressing multiple access interference in a multi-user communication system.

In view of this, embodiments of this application provide a data transmission method and apparatus, so that in the one frequency hopping cycle, there are a plurality of (for example, more than two) frequency hopping moments in time domain, and a plurality of (for example, more than two) optional frequency hopping frequencies may be supported in frequency domain, thereby resolving a multiple access interference problem in the multi-user communication system.

Embodiments of this application may be applied to various communication systems, for example, a LTE system, a worldwide interoperability for microwave access (WiMAX) communication system, a 5th generation (5G) system such as a NR access technology, and a future communication system such as a 6th generation (6G) system. Embodiments of this application are applicable to a communication system provided that there is a data transmission requirement in the communication system.

FIG. 1 is a diagram of a network architecture of a communication system to which an embodiment of this application is applicable. The communication system may be a 5G communication system, or another communication system such as a 6G communication system. This is not limited In some embodiments. The communication system includes a network device and a terminal device. An example in which there is one network device is used, and an example in which there are six terminal devices is used. Certainly, actual quantities are not limited herein.

The network device includes, for example, an access network (AN) device and a radio access network (RAN) device, where the access network device, for example, a base station (for example, an access point), may be a device, in an access network, that communicates with a wireless terminal device over an air interface through one or more cells. The base station may be configured to mutually convert a received over-the-air frame and an internet protocol (IP) packet, and serve as a router between the terminal device and a remaining part of the access network. The remaining part of the access network may include an IP network. The network device may further coordinate attribute management of the air interface. For example, the network device may include an evolved NodeB (NodeB, eNB, or e-NodeB) in a LTE system or a long term evolution-advanced (LTE-A) system; may include a next generation NodeB (gNB), a next generation evolved NodeB (ng-eNB), or an enhanced next generation NodeB (en-gNB) in a 5G mobile communication technology NR system; may include a central unit (CU) and a distributed unit (DU) in a cloud radio access network (Cloud RAN) system; or may further include a relay device. This is not limited in embodiments of this application.

The network device may be deployed on land, for example, deployed indoors or outdoors or deployed as a handheld device or a vehicle-mounted device; or may be deployed on a water surface; or may be deployed in the air, for example, deployed in an airplane, an unmanned aerial vehicle, a balloon, or an artificial satellite. Application scenarios of the network device are not limited in embodiments of this application.

A terminal device, also referred to as a terminal, includes a device that provides a user with voice and/or data connectivity, for example, may include a handheld device having a wireless connection function, or a processing device connected to a wireless modem. The terminal device may communicate with a core network through a RAN, and exchange a voice and/or data with the RAN. The terminal device may include user equipment (UE), a wireless terminal device, a mobile terminal device, a device-to-device (D2D) communication terminal device, a V2X terminal device, a machine-to-machine/machine-type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communication service (PCS) phone, a cordless telephone set, a session initiation protocol (SIP) phone, a wireless local loop (WLL) station, or a personal digital assistant (PDA). The terminal device may further include a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

The terminal device may be deployed on land, for example, deployed indoors or outdoors or deployed as a handheld device or a vehicle-mounted device; or may be deployed on a water surface; or may be deployed in the air, for example, deployed in an airplane, an unmanned aerial vehicle, or a balloon. Application scenarios of the terminal device are not limited in embodiments of this application.

By way of example and not limitation, in embodiments of this application, the terminal device may be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, a wearable intelligent device includes a full-featured and large-sized device that can implement all or a part of functions without depending on a smartphone, for example, a smart watch or smart glasses, and includes a device that is dedicated to only one type of application function and that needs to work together with another device such as a smartphone, for example, a smart band, a smart helmet, smart jewelry, and other devices used for vital sign monitoring.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBUs).

In the network architecture shown in FIG. 1, the network device and the terminal device may form a communication system. For example, the network device and terminal devices 1 to 6 form a communication system. In the communication system, the network device may send configuration information to the terminal devices 1 to 6, the terminal devices 1 to 6 may receive the configuration information and send uplink data to the network device based on the configuration information, and the network device may receive the uplink data sent by the terminal devices 1 to 6.

In addition, the terminal devices alone may also form a communication system. For example, the terminal devices 4 to 6 form a communication system. For example, in an Internet of vehicles system, a terminal device 1 sends configuration information to a terminal device 2, and receives data sent by the terminal device 2. The terminal device 2 receives the configuration information sent by the terminal device 1, and sends the data to the terminal device 1 based on the configuration information.

In addition, the network device and the terminal device may further form a relay system. For example, as shown in FIG. 2, in the system, data is forwarded between the network device and the terminal device by using a relay device (or referred to as a relay node). The relay device may be a small cell, an integrated access and backhaul (IAB) node, a DU, a terminal device, a transmission and reception point (TRP), or the like. This is not limited in this application. It should be understood that, that the relay system shown in FIG. 2 is a single-hop relay system is used as an example, that is, there is only one relay device between the network device and the terminal device. During specific implementation, the network device and the terminal device may further form a multi-hop relay system, that is, there are a plurality of relay devices between the network device and the terminal device. This is not limited in this application.

It should be understood that roles of the network device and the terminal device in embodiments of this application may be relative. For example, the relay device in FIG. 2 may be configured as a mobile network device. For the terminal device that accesses the network device by using the relay device, the relay device is a network device. However, for the network device, the relay device is a terminal device, that is, the network device communicates with the relay device according to a wireless air interface protocol. Certainly, the network device and the relay device may alternatively communicate with each other according to an interface protocol between network devices. In this case, the relay device is also a network device relative to the network device. Therefore, both the network device and the terminal device in embodiments of this application may be collectively referred to as a communication apparatus.

It should be understood that embodiments of this application may be applied to multi-user data transmission in a 5G NR system, and may include the following three scenarios:

(1) Scheduling-based (scheduled) uplink data transmission scenario: The network device preconfigures a frequency hopping pattern for each terminal in a network, and the terminal device activates the frequency hopping pattern through scheduling by the network device, and sends uplink data based on the frequency hopping pattern preconfigured by the network device.

(2) Preconfiguration-based (configured) uplink data transmission scenario: The network device preconfigures a frequency hopping pattern for each terminal in a network, and the terminal device randomly activates the frequency hopping pattern based on data arrival, and sends uplink data based on the frequency hopping pattern preconfigured by the network device.

(3) Uplink data transmission scenario based on random selection: The network device broadcasts an optional frequency hopping pattern set to each terminal in a network, and the terminal device performs random activation based on data arrival, and randomly selects a frequency hopping pattern from the frequency hopping pattern set to send uplink data.

It should be understood that the network architecture and the service scenarios described in embodiments of this application are intended to describe the technical solutions in embodiments of this application more clearly, and do not constitute a limitation on the technical solutions provided in embodiments of this application. A person of ordinary skill in the art may know that, with the evolution of the network architecture and the emergence of new service scenarios, the technical solutions provided in embodiments of this application are also applicable to similar technical problems.

Figure 3A:
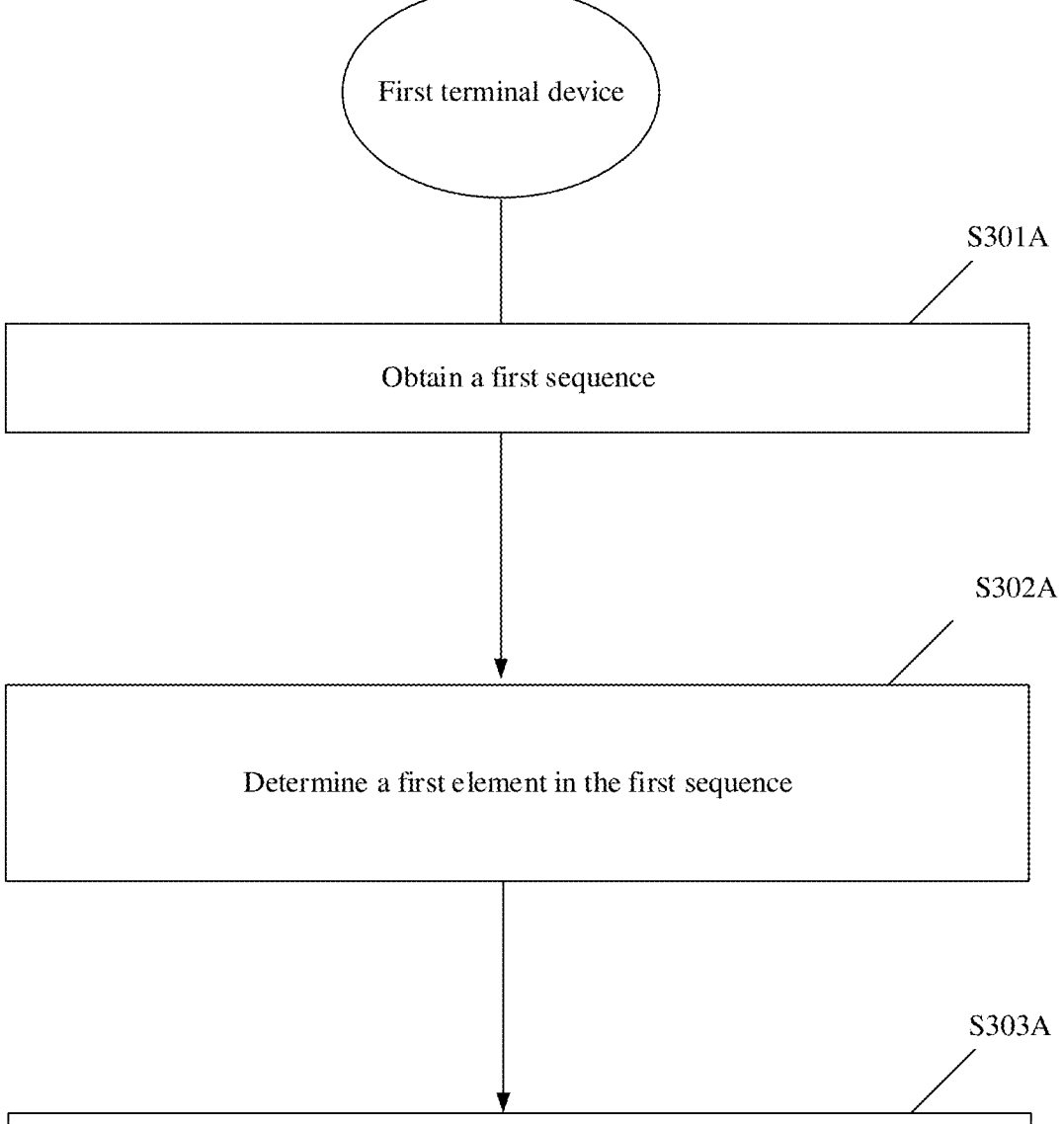
FIG. 3A is a flowchart of a data transmission method according to an embodiment of this application.

FIG. 3A is a flowchart of a data transmission method according to an embodiment of this application. The method may be applied to the scenario shown in FIG. 1 or FIG. 2. The method includes the following steps.

S301A: A first terminal device obtains a first sequence.

The first terminal device may be any terminal device in FIG. 1 or FIG. 2.

The first sequence includes Q elements, the Q elements correspond to Q different frequencies, and Q is a positive integer greater than 1.

Using Q=6 as an example, assuming that the first sequence is {F1, F2, F3, F4, F5, F6}, F1, F2, F3, F4, F5, and F6 respectively correspond to six different frequencies.

For ease of description, in this specification, a frequency corresponding to any element in the first sequence may be directly represented by using the any element. For example, a frequency corresponding to F1 may be directly described as an F1 frequency (or directly described as a frequency F1, or directly described as F1), and a frequency corresponding to F2 may be directly described as an F2 frequency (or directly described as a frequency F2, or directly described as F2).

S302A: The first terminal device determines a first element in the first sequence.

In some embodiments, the first terminal device may implement frequency hopping transmission based on a frequency corresponding to an element in the first sequence. In other words, when the first terminal device performs the frequency hopping transmission, an optional frequency is a frequency corresponding to each element in the first sequence. At different times, frequencies based on which the first terminal device performs data transmission may be different.

Frequency hopping transmission is a communication manner in which a receiving end and a transmitting end transform, according to a predetermined rule, a frequency domain resource used in an information transmission process, to obtain a frequency diversity gain.

First element: The first element is an element that is in a first sequence and that corresponds to a start frequency of the first terminal device in one frequency hopping cycle, that is, an element that is in the first sequence and that corresponds to a frequency corresponding to the first terminal device at a first frequency hopping moment in one frequency hopping cycle.

Frequency hopping cycle: As time changes, a frequency based on which the first terminal device performs data transmission has a periodic hopping regularity, and the time spent in completing one periodic change is referred to as one frequency hopping cycle. In other words, as time changes, a frequency based on which the first terminal device performs data transmission hops in cycles, and the time spent in completing one cycle is referred to as one frequency hopping cycle. It should be understood that, after one frequency hopping cycle or an integer multiple of the one frequency hopping cycle from any frequency hopping moment of the first terminal device, the frequency based on which the first terminal device performs data transmission returns to the frequency based on which the first terminal device performs data transmission at the any frequency hopping moment. For ease of description, "the frequency based on which the first terminal device performs data transmission" may be referred to as "the frequency corresponding to the first terminal device" below.

S303A: The first terminal device performs data transmission in one frequency hopping cycle based on the frequency corresponding to the element in the first sequence, where the one frequency hopping cycle includes M frequency hopping moments, the frequency corresponding to the first terminal device at the first frequency hopping moment is a frequency corresponding to the first element, a frequency corresponding to the first terminal device at an $i^{th}$ frequency hopping moment is a frequency corresponding to an element obtained by cyclically moving from the first element leftward (or rightward) for i−1 times according to a specified rule, i is a positive integer from 2 to M, and M is a positive integer greater than or equal to 2.

In some embodiments, in a process of cyclically moving from the first element leftward (or rightward) for i−1 times according to the specified rule, movement directions in the i−1 times of movement may be the same or may be different. This is not limited In some embodiments. A quantity of bits per movement (or referred to as a movement distance, a movement amount, or the like) in the i−1 times of movement may be the same or may be different. This is not limited In some embodiments.

In a possible design, the specified rule includes: Starting from the first element, each element is cyclically moved leftward or rightward in turn (that is, in order) for i−1 times, where in the i−1 times of movement, a direction of each movement is fixed (for example, cyclically moving leftward only or cyclically moving rightward only during each movement), and a quantity of bits per movement is fixed, for example, one bit, two bits, or three bits per movement.

Moving rightward for one bit each time in the i−1 times of movement is used as an example. That the first terminal device performs data transmission in one frequency hopping cycle based on the frequency corresponding to the element in the first sequence includes: At the first frequency hopping moment, the first terminal device performs data transmission based on the frequency corresponding to the first element; at a second frequency hopping moment, the first terminal device performs data transmission based on a frequency corresponding to a second element, where the second element is a frequency corresponding to an element obtained by cyclically moving from the first element rightward once according to the specified rule; at a third frequency hopping moment, the first terminal device performs data transmission based on a frequency corresponding to a third element, where the third element is a frequency corresponding to an element obtained by cyclically moving from the second element rightward once according to the specified rule, that is, a frequency corresponding to an element obtained by cyclically moving from the first element rightward twice according to the specified rule; and so on. The cyclic movement is performed according to the foregoing rule until a last frequency hopping moment of the one frequency hopping cycle.

Figures 3B, 4A:
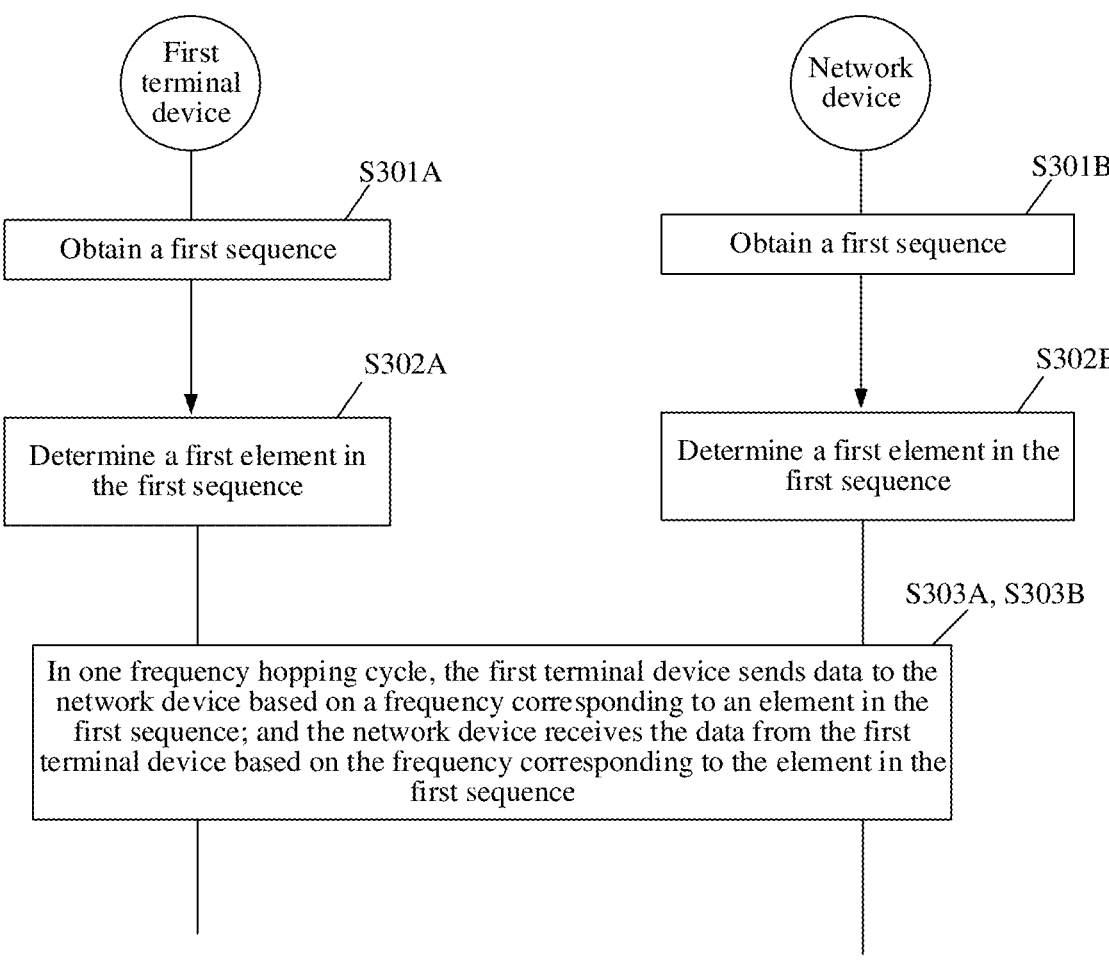
FIG. 3B is a flowchart of a data transmission method according to an embodiment of this application.
FIG. 4A is a schematic diagram of frequencies corresponding to a first terminal device at different frequency hopping moments.

Example 1: It is assumed that M=4, to be specific, the one frequency hopping cycle includes four frequency hopping moments, the first sequence is {F1, F2, F3, F4}, and the first element is F1. Refer to FIG. 4A, frequencies corresponding to the first terminal device at different frequency hopping moments are as follows: At a moment t1 (that is, the first frequency hopping moment), the first terminal device performs data transmission based on F1; at a moment t2 (that is, the second frequency hopping moment), the first terminal device performs data transmission based on F2; at a moment t3 (that is, the third frequency hopping moment), the first terminal device performs data transmission based on F3; and at a moment t4 (that is, a fourth frequency hopping moment), the first terminal device performs data transmission based on F4. t1 to t4 constitute the one frequency hopping cycle. After t1 to t4 end, a next frequency hopping cycle is entered, for example, at a moment t5 (that is, the first frequency hopping moment), the first terminal device performs data transmission based on F1; at a moment t6 (that is, the second frequency hopping moment), the first terminal device performs data transmission based on F2; at a moment t7 (that is, the third frequency hopping moment), the first terminal device performs data transmission based on F3; and at a moment t8 (that is, the fourth frequency hopping moment), the first terminal device performs data transmission based on F4. It can be learned that in the moments t1 to t4 and the moments t5 to t8 (that is, two frequency hopping cycles), a change rule of the frequencies corresponding to the first terminal device is the same: F1→F2→F3→F4. A frequency corresponding to the first terminal device at the $i^{th}$ frequency hopping moment is a frequency corresponding to an element obtained by cyclically moving from F1 rightward in turn for i−1 times.

Moving leftward for one bit each time in the i−1 times of movement is used as an example. That the first terminal device performs data transmission in one frequency hopping cycle based on the frequency corresponding to the element in the first sequence includes: At the first frequency hopping moment, the first terminal device performs data transmission based on the frequency corresponding to the first element; at a second frequency hopping moment, the first terminal device performs data transmission based on a frequency corresponding to a second element, where the second element is a frequency corresponding to an element obtained by cyclically moving from the first element leftward once according to the specified rule; at a third frequency hopping moment, the first terminal device performs data transmission based on a frequency corresponding to a third element, where the third element is a frequency corresponding to an element obtained by cyclically moving from the second element leftward once according to the specified rule, that is, a frequency corresponding to an element obtained by cyclically moving from the first element leftward twice according to the specified rule; and so on. The cyclic movement is performed according to the foregoing rule until a last frequency hopping moment of the one frequency hopping cycle.

Figures 4B, 5, 6A, 6B:
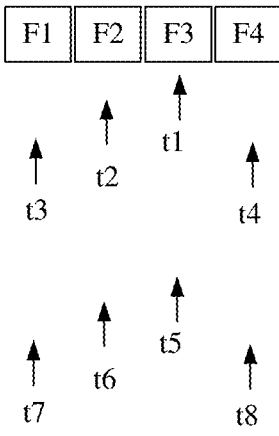
FIG. 4B is a schematic diagram of frequencies corresponding to a first terminal device at different frequency hopping moments.
FIG. 5 is a schematic diagram of performing cyclic shifts on a first sequence.
FIG. 6A is a schematic diagram of performing cyclic shifts on a first candidate sequence.
FIG. 6B is a schematic diagram of performing cyclic shifts on a second candidate sequence.

Example 2: It is assumed that M=4, to be specific, the one frequency hopping cycle includes four frequency hopping moments, the first sequence is {F1, F2, F3, F4}, and the first element is F3. Refer to FIG. 4B, frequencies corresponding to the first terminal device at different frequency hopping moments are as follows: At a moment t1 (that is, the first frequency hopping moment), the first terminal device performs data transmission based on F3; at a moment t2 (that is, the second frequency hopping moment), the first terminal device performs data transmission based on F2; at a moment t3 (that is, the third frequency hopping moment), the first terminal device performs data transmission based on F1; and at a moment t4 (that is, a fourth frequency hopping moment), the first terminal device performs data transmission based on F4. t1 to t4 constitute the one frequency hopping cycle. After t1 to t4 end, a next frequency hopping cycle is entered, for example, at a moment t5 (that is, the first frequency hopping moment), the first terminal device performs data transmission based on F3; at a moment t6 (that is, the second frequency hopping moment), the first terminal device performs data transmission based on F2; at a moment t7 (that is, the third frequency hopping moment), the first terminal device performs data transmission based on F1; and at a moment t8 (that is, the fourth frequency hopping moment), the first terminal device performs data transmission based on F4. It can be learned that in the moments t1 to t4 and the moments t5 to t8 (that is, two frequency hopping cycles), a change rule of the frequencies corresponding to the first terminal device is the same: F3→F2→F1→F4. A frequency corresponding to the first terminal device at the $i^{th}$ frequency hopping moment is a frequency corresponding to an element obtained by cyclically moving from F1 leftward in turn for i−1 times.

In some embodiments, when the first terminal device performs data transmission based on the frequency corresponding to the element in the first sequence, in addition to determining, according to the method (for example, FIG. 4A or FIG. 4B) described above, the frequency corresponding to the first terminal device at each frequency hopping moment, the first terminal device may alternatively first generate a first frequency hopping pattern corresponding to the first terminal device based on the first sequence, and then determine the frequency corresponding to the first terminal device at each frequency hopping moment based on the first frequency hopping pattern, that is, perform frequency hopping transmission based on the first frequency hopping pattern.

The first frequency hopping pattern is used to represent a frequency hopping characteristic of the first terminal device in the one frequency hopping cycle. For example, the first frequency hopping pattern includes M frequencies, where the M frequencies are in a one-to-one correspondence with the M frequency hopping moments in the one frequency hopping cycle. Correspondingly, the first terminal device performs data transmission at each frequency hopping moment based on a frequency corresponding to the frequency hopping moment in the first frequency hopping pattern.

For example, that the first terminal device generates a first frequency hopping pattern corresponding to the first terminal device based on the first sequence includes: The first terminal device performs M−1 cyclic shift operations on the first sequence, to obtain M sequences (including the first sequence and a sequence obtained by performing each of the M−1 cyclic shift operations), and forms the M sequences into a matrix, where each row of the matrix consists of all elements in one of the M sequences, each row corresponds to one frequency hopping moment, and each column of the matrix consists of one element in each of the M sequences. The first frequency hopping pattern corresponding to the first terminal device is a column in the matrix, and the column is a column in which the first element in the first sequence is located.

Example 3: It is assumed that the first sequence is {F1, F2, F3, F4, F5, F6}, the one frequency hopping cycle includes four frequency hopping moments, and the frequency corresponding to the first terminal device at the first frequency hopping moment is a frequency (that is, F1) corresponding to the first element in the first sequence. Cyclic shifts are performed leftward on {F1, F2, F3, F4, F5, F6} for three times, as shown in FIG. 5, and three sequences {F2, F3, F4, F5, F6, F1}, {F3, F4, F5, F6, F1, F2}, and {F4, F5, F6, F1, F2, F3} may be obtained respectively. The following matrix may be formed based on the foregoing four sequences:

$$\begin{bmatrix} F1, F2, F3, F4, F5, F6 \\ F2, F3, F4, F5, F6, F1 \\ F3, F4, F5, F6, F1, F2 \\ F4, F5, F6, F1, F2, F3 \end{bmatrix}$$

In the foregoing matrix, the first row corresponds to the first frequency hopping moment, the second row corresponds to the second frequency hopping moment, the third row corresponds to the third frequency hopping moment, and the fourth row corresponds to the fourth frequency hopping moment.

It is assumed that the first element is F1 in {F1, F2, F3, F4, F5, F6}. It can be learned from the foregoing matrix or FIG. 5 that the frequency corresponding to the first terminal device at the first frequency hopping moment (T1) is the frequency corresponding to the first element in the first sequence (that is, F1). Correspondingly, a frequency corresponding to the first terminal device at another frequency hopping moment is a first element (that is, F2, F3, or F4) in a sequence corresponding to the another frequency hopping moment. It can be learned that the first frequency hopping pattern corresponding to the first terminal device is the first column in the foregoing matrix, that is, F1, F2, F3, and F4. The first terminal device performs data transmission at four frequency hopping moments (that is, T1, T2, T3, and T4) in the one frequency hopping cycle based on F1, F2, F3, and F4 in turn.

Certainly, an example in which the first element is F1 in the first sequence {F1, F2, F3, F4, F5, F6} is used herein, which is not limited in practice. For example, if the first element is F2 in the first sequence {F1, F2, F3, F4, F5, F6}, the first frequency hopping pattern corresponding to the first terminal device is the second column in the foregoing matrix, that is, F2, F3, F4, and F5. Other cases are deduced in a similar manner, and details are not described herein again.

In addition, it can be learned that although the method shown in Example 3 and the method shown in Example 1 are described in different manners, a same frequency hopping effect can be achieved (that is, the first terminal device at the moment T1 corresponds to F1, the first terminal device at the moment T2 corresponds to F2, the first terminal device at the moment T3 corresponds to F3, and the first terminal device at the moment T4 corresponds to F4). It may be understood that, in Example 1, an arrangement manner of elements (or frequencies) in the first sequence remains unchanged, and a corresponding position of the first terminal device in the first sequence is changed. In Example 3, a corresponding position of the first terminal device in the first sequence remains unchanged, and an arrangement manner of elements (or frequencies) in the first sequence is changed.

It should be noted that, in this specification, that the first terminal device corresponds to only one frequency at one frequency hopping moment is used as an example. However, this is not limited in practice. The first terminal device may also correspond to a plurality of frequencies at one frequency hopping moment, that is, perform data transmission based on the plurality of frequencies at the one frequency hopping moment. For example, the first terminal device further obtains a third sequence (where the third sequence is different from the first sequence, and may include different elements, or include a same element but with different element arrangement manners), and determines a second element in the third sequence. In one frequency hopping cycle, the first terminal device further performs data transmission based on a frequency corresponding to an element in the third sequence, where a frequency corresponding to the second element is the frequency corresponding to the first terminal device at the first frequency hopping moment.

However, for ease of clearer description, in this specification, an example in which one terminal device corresponds to only one frequency at one frequency hopping moment is mainly used.

In some embodiments, data transmission performed by the first terminal device includes but is not limited to the following transmission types:

(1) Uplink transmission (that is, the first terminal device sends data to a network device).

(2) Downlink transmission (that is, the first terminal device receives data sent by the network device).

(3) Sidelink transmission (that is, the first terminal device sends data to another terminal device or receives data from another terminal device).

It should be understood that the foregoing three transmission types are merely examples but not specific limitations.

For ease of clearer description, uplink transmission is used as an example in this specification. That is, S303A is that the first terminal device sends uplink data to the network device based on the frequency corresponding to the element in the first sequence.

Refer to FIG. 3B, in a scenario in which a first terminal device sends uplink data to a network device based on a frequency corresponding to an element in a first sequence, a data transmission method performed by the network device corresponds to a data transmission method performed by the first terminal device, and includes the following steps.

S301B: The network device obtains the first sequence, where the first sequence includes Q elements, the Q elements correspond to Q different frequencies, and Q is a positive integer greater than 1.

S302B: The network device determines a first element in the first sequence.

S303B: The network device receives data from the first terminal device in one frequency hopping cycle based on the frequency corresponding to the element in the first sequence, where the one frequency hopping cycle includes M frequency hopping moments, a frequency corresponding to the first terminal device at a first frequency hopping moment is a frequency corresponding to the first element, a frequency corresponding to the first terminal device at an $i^{th}$ frequency hopping moment is a frequency corresponding to an element obtained by cyclically moving from the first element leftward (or rightward) for i−1 times according to a specified rule, i is a positive integer from 2 to M, and M is a positive integer greater than or equal to 2.

For the first sequence and the first element, refer to the foregoing related descriptions. Details are not described herein again. For a specific implementation in which the network device performs data transmission with the first terminal device based on the frequency corresponding to the element in the first sequence, refer to the specific implementation of the first terminal device in S303A. Details are not described herein again.

The foregoing describes a frequency hopping transmission process of the first terminal device in one frequency hopping cycle. For a frequency hopping transmission process of the first terminal device in another frequency hopping cycle, refer to the frequency hopping transmission process of the first terminal device in the foregoing one frequency hopping cycle. Details are not described herein again.

It can be learned from the foregoing description that In some embodiments, the first terminal device performs data transmission in one frequency hopping cycle based on the frequency corresponding to the element in the first sequence, so that the first terminal device may have a plurality of (for example, more than two) frequency hopping moments in the one frequency hopping cycle in time domain, and may support a plurality of (for example, more than two) optional frequency hopping frequencies in frequency domain, thereby resolving a multiple access interference problem in a multi-user communication system.

In some embodiments, the Q elements in the first sequence are in a one-to-one correspondence with Q terminal devices. In one frequency hopping cycle, each of the Q terminal devices may perform data transmission based on the frequency corresponding to the element in the first sequence. A different terminal device determines a different start frequency (that is, a frequency corresponding to the first frequency hopping moment in one cycle) based on the first sequence.

For example, M=4, Q=6, the first sequence is {F1, F2, F3, F4, F5, F6}, and movement is performed rightward for one bit each time in the i−1 times of movement. It is assumed that a start frequency of the first terminal device is F1, a start frequency of a second terminal device is F2, a start frequency of a third terminal device is F3, a start frequency of a fourth terminal device is F4, a start frequency of a fifth terminal device is F5, and a start frequency of a sixth terminal device is F6.

(1) The first terminal device: At a moment t1 (that is, the first frequency hopping moment), the first terminal device performs data transmission based on F1; at a moment t2 (that is, a second frequency hopping moment), the first terminal device performs data transmission based on F2; at a moment t3 (that is, a third frequency hopping moment), the first terminal device performs data transmission based on F3; and at a moment t4 (that is, a fourth frequency hopping moment), the first terminal device performs data transmission based on F4.

(2) The second terminal device: At the moment t1, the second terminal device performs data transmission based on F2; at the moment t2, the second terminal device performs data transmission based on F3; at the moment t3, the second terminal device performs data transmission based on F4; and at the moment t4, the second terminal device performs data transmission based on F5.

(3) The third terminal device: At the moment t1, the third terminal device performs data transmission based on F3; at the moment t2, the third terminal device performs data transmission based on F4; at the moment t3, the third terminal device performs data transmission based on F5; and at the moment t4, the third terminal device performs data transmission based on F6.

(4) The fourth terminal device: At the moment t1, the fourth terminal device performs data transmission based on F4; at the moment t2, the fourth terminal device performs data transmission based on F5; at the moment t3, the fourth terminal device performs data transmission based on F6; and at the moment t4, the fourth terminal device performs data transmission based on F1.

(5) The fifth terminal device: At the moment t1, the fifth terminal device performs data transmission based on F5; at the moment t2, the fifth terminal device performs data transmission based on F6; at the moment t3, the fifth terminal device performs data transmission based on F1; and at the moment t4, the fifth terminal device performs data transmission based on F2.

(6) The sixth terminal device: At the moment t1, the sixth terminal device performs data transmission based on F6; at the moment t2, the sixth terminal device performs data transmission based on F1; at the moment t3, the sixth terminal device performs data transmission based on F2; and at the moment t4, the sixth terminal device performs data transmission based on F3.

Similarly, each terminal device may alternatively generate a frequency hopping pattern corresponding to the terminal device in advance based on the first sequence, and then determine a frequency corresponding to the terminal device at each frequency hopping moment based on the frequency hopping pattern, that is, perform frequency hopping transmission based on the frequency hopping pattern corresponding to the terminal device. The foregoing first sequence {F1, F2, F3, F4, F5, F6} is still used. Each terminal device performs a cyclic shift operation on the first sequence to obtain the following matrix:

$$\begin{bmatrix} F1, F2, F3, F4, F5, F6 \\ F2, F3, F4, F5, F6, F1 \\ F3, F4, F5, F6, F1, F2 \\ F4, F5, F6, F1, F2, F3 \end{bmatrix}$$

A frequency corresponding to the first terminal device at the first frequency hopping moment is a frequency (that is, F1) corresponding to the first element in the first sequence, and correspondingly, a first frequency hopping pattern corresponding to the first terminal device is the first column in the foregoing matrix, that is, F1, F2, F3, and F4. A frequency corresponding to the second terminal device at the first frequency hopping moment is a frequency (that is, F2) corresponding to a second element in the first sequence, and correspondingly, a second frequency hopping pattern corresponding to the second terminal device is the second column in the foregoing matrix, that is, F2, F3, F4, and F5. A frequency corresponding to the third terminal device at the first frequency hopping moment is a frequency (that is, F3) corresponding to a third element in the first sequence, and correspondingly, a third frequency hopping pattern corresponding to the third terminal device is the third column in the foregoing matrix, that is, F3, F4, F5, and F6. A frequency corresponding to the fourth terminal device at the first frequency hopping moment is a frequency (that is, F4) corresponding to a fourth element in the first sequence, and correspondingly, a fourth frequency hopping pattern corresponding to the fourth terminal device is the fourth column in the matrix, that is, F4, F5, F6, and F1. A frequency corresponding to the fifth terminal device at the first frequency hopping moment is a frequency (that is, F5) corresponding to a fifth element in the first sequence, and correspondingly, a fifth frequency hopping pattern corresponding to the fifth terminal device is the fifth column in the matrix, that is, F5, F6, F1, and F2. A frequency corresponding to the sixth terminal device at the first frequency hopping moment is a frequency (that is, F6) corresponding to a sixth element in the first sequence, and correspondingly, a sixth frequency hopping pattern corresponding to the sixth terminal device is the sixth column in the foregoing matrix, that is, F6, F1, F2, and F3.

It should be noted that, the foregoing uses an example in which a quantity of elements in the first sequence is the same as a quantity of terminal devices, that is, each element in the first sequence corresponds to one terminal device, that is, the Q elements in the first sequence are in a one-to-one correspondence with the Q terminal devices. However, in specific implementation, the quantity of elements in the first sequence may be different from the quantity of terminal devices. This is not limited in this application. For example, there may be three terminal devices (the first terminal device, the second terminal device, and the third terminal device), frequency domain patterns corresponding to the terminal devices are respectively the first column, the second column, and the third column in the matrix, and the fourth column to the sixth column in the matrix may have no corresponding terminal devices.

In addition, each terminal device such as the first terminal device performs a cyclic shift operation on the first sequence. Actually, a plurality of frequency domain patterns may be obtained (for example, each column in the foregoing matrix is obtained). However, the first terminal device may only need to know which frequency domain pattern corresponds to the first terminal device or the first terminal device only needs to be capable of knowing which frequency domain pattern corresponds to the first terminal device. For another frequency domain pattern, the first terminal device may not need to know which terminal devices correspond to the another frequency domain pattern or the first terminal device may not need to be capable of knowing which terminal devices correspond to the another frequency domain pattern.

Similarly, a method on a network device side corresponds to a method on a terminal device side. For example, when a terminal device sends data to the network device at a frequency hopping moment based on a frequency in the first sequence, the network device receives, at the frequency hopping moment based on the frequency, the data sent by the terminal device.

Based on this implementation, a plurality of terminal devices may share a same communication resource, and each terminal device may have a plurality of (for example, more than two) frequency hopping moments in one frequency hopping cycle in time domain, and may support a plurality of (for example, more than two) optional frequency hopping frequencies in frequency domain, thereby resolving the multiple access interference problem in the multi-user communication system and improving resource utilization.

In some embodiments, the first sequence is one of a plurality of candidate sequences, the plurality of candidate sequences are in a one-to-one correspondence with a plurality of terminal device groups, the first terminal device is located in a first terminal device group in the plurality of terminal device groups. In one frequency hopping cycle, each terminal device in each terminal device group may perform data transmission with the network device based on a candidate sequence corresponding to the terminal device group.

For example, in a scenario in which the first terminal device performs data transmission with the network device based on the frequency corresponding to the element in the first sequence, the second terminal device further performs data transmission with the network device based on a frequency corresponding to an element in a second sequence, where the second sequence is a sequence in the plurality of candidate sequences other than the first sequence, the second terminal device is located in a second terminal device group in the plurality of terminal device groups, and the second terminal device group is different from the first terminal device group. For a specific implementation in which the second terminal device performs data transmission with the network device based on the second sequence, refer to the foregoing specific implementation in which the first terminal device performs data transmission with the network device based on the first sequence. Details are not described herein again.

Similarly, each terminal device in each terminal device group may generate a frequency hopping pattern corresponding to the terminal device in advance based on a candidate sequence corresponding to the terminal device group, and then determine a frequency corresponding to the terminal device at each frequency hopping moment based on the frequency hopping pattern, that is, perform frequency hopping transmission based on the frequency hopping pattern.

For example, it is assumed that there are three terminal device groups, where the first terminal device group (UE 1 to UE 6) corresponds to a first candidate sequence {F1, F2, F3, F4, F5, F6}, the second terminal device group (UE 7 to UE 12) corresponds to a second candidate sequence {F3, F1, F4, F6, F2, F5}, and a third terminal device group (UE 13 to UE 18) corresponds to a third candidate sequence {F5, F6, F2, F1, F4, F3}.

FIG. 6A is a schematic diagram of performing cyclic shifts on a first candidate sequence. In FIG. 6A, a frequency domain pattern corresponding to each UE is a column in which the UE is located. For example, a frequency domain pattern corresponding to UE 1 is F1, F6, F5, and F4.

FIG. 6B is a schematic diagram of performing cyclic shifts on a second candidate sequence. In FIG. 6B, a frequency domain pattern corresponding to each UE is a column in which the UE is located. For example, a frequency domain pattern corresponding to UE 11 is F2, F6, F4, and F1.

FIG. 6C is a schematic diagram of performing cyclic shifts on a third candidate sequence. In FIG. 6C, a frequency domain pattern corresponding to each UE is a column in which the UE is located. For example, a frequency domain pattern corresponding to UE 14 is F6, F5, F3, and F4.

Further, to better resolve a multiple access interference problem in a multi-user communication system, a quantity of same elements at a same relative position in any two sequences in the plurality of candidate sequences does not exceed a preset quantity d.

Using d=2 as an example, the foregoing first candidate sequence {F1, F2, F3, F4, F5, F6}, second candidate sequence {F3, F1, F4, F6, F2, F5}, and third candidate sequence {F5, F6, F2, F1, F4, F3} are still used. It can be learned that the same elements at a same relative position in the second candidate sequence and the first candidate sequence are only F3 and F6 (F3 and F6 are separated by two elements in the first candidate sequence, and F3 and F6 are also separated by two elements in the second candidate sequence). Therefore, a quantity of same elements at the same relative position in the second candidate sequence and the first candidate sequence does not exceed 2. The same elements at a same relative position in the third candidate sequence and the first candidate sequence are only F5 and F6 (F5 and F6 are adjacent in the first candidate sequence, and F5 and F6 are also adjacent in the second candidate sequence). Therefore, a quantity of same elements at the same relative position in the third candidate sequence and the first candidate sequence does not exceed 2.

The following provides two specific examples.

Example A: A quantity of terminal devices in each terminal device group is 6, a quantity of same elements at a same relative position in any two sequences does not exceed 2, and a candidate sequence consisting of six different frequencies F1, F2, F3, F4, F5, and F6 includes:

{F1, F2, F3, F4, F5, F6};
    {F3, F1, F4, F6, F2, F5};
    {F2, F1, F3, F4, F6, F5};
    {F3, F1, F2, F5, F6, F4};
    {F4, F2, F6, F3, F5, F1};
    {F5, F6, F2, F1, F4, F3};
    {F6, F4, F1, F3, F5, F2};
    {F2, F5, F4, F6, F1, F3};
    {F6, F3, F1, F5, F2, F4};
    {F3, F1, F6, F4, F5, F2};
    {F3, F6, F4, F2, F5, F1};
    {F2, F1, F5, F6, F3, F4};
    {F4, F5, F1, F6, F3, F2};
    {F4, F1, F6, F2, F3, F5};
    {F5, F3, F4, F1, F2, F6};
    {F4, F1, F5, F3, F6, F2};

{F5, F4, F3, F2, F1, F6};
{F1, F2, F4, F3, F6, F5};
{F5, F4, F2, F3, F6, F1}; and
{F2, F6, F1, F4, F5, F3}.

It should be understood that the foregoing 20 sequences are merely some examples of sequences that may be formed by F1, F2, F3, F4, F5, and F6. Certainly, in actual application, F1, F2, F3, F4, F5, and F6 may further form other sequences. This is not limited in this application.

If Q=6, the first sequence in S301A may be any one of the foregoing sequences, or the first sequence may be obtained by performing a cyclic shift on any one of the foregoing sequences.

Example B: A quantity of terminal devices in each terminal device group is 8, a quantity of same elements at a same relative position in any two sequences does not exceed 2, and a candidate sequence consisting of eight different frequencies F1, F2, F3, F4, F5, F6, F7, and F8 includes:

{F, F2, F3, F4, F5, F6, F7, F8};
{F3, F5, F8, F1, F6, F7, F2, F4};
{F5, F1, F7, F2, F8, F4, F6, F3};
{F3, F7, F2, F5, F1, F8, F6, F4};
{F3, F1, F6, F5, F8, F7, F4, F2};
{F6, F4, F1, F8, F3, F2, F7, F5};
{F5, F7, F3, F1, F4, F2, F6, F8};
{F2, F7, F1, F5, F3, F6, F4, F8};
{F5, F4, F2, F8, F7, F3, F6, F1};
{F2, F8, F3, F1, F5, F7, F4, F6};
{F5, F7, F1, F2, F6, F3, F8, F4};
{F, F3, F2, F4, F7, F8, F5, F6};
{F2, F5, F3, F7, F1, F6, F8, F4};
{F4, F3, F2, F1, F8, F7, F6, F5};
{F4, F1, F6, F2, F3, F5, F7, F8};
{F2, F6, F7, F1, F3, F4, F8, F5};
{F3, F6, F2, F1, F7, F5, F4, F8};
{F6, F8, F1, F5, F2, F7, F3, F4};
{F6, F2, F7, F4, F8, F1, F3, F5};
{F, F2, F4, F6, F7, F3, F8, F5};
{F, F3, F8, F2, F6, F4, F7, F5};
{F6, F1, F2, F7, F8, F3, F5, F4};
{F3, F8, F7, F2, F1, F6, F4, F5};
{F5, F2, F3, F6, F8, F7, F1, F4};
{F4, F1, F3, F7, F5, F8, F6, F2};
{F3, F8, F1, F4, F6, F5, F7, F2};
{F5, F3, F4, F2, F7, F6, F1, F8};
{F3, F2, F8, F6, F5, F1, F4, F7};
{F8, F2, F4, F5, F1, F6, F3, F7};
{F, F8, F4, F7, F2, F6, F5, F3};
{F3, F4, F7, F1, F8, F2, F5, F6};
{F5, F7, F6, F8, F3, F4, F1, F2};
{F3, F2, F5, F4, F1, F7, F8, F6};
{F4, F5, F8, F2, F1, F3, F6, F7};
{F7, F5, F2, F1, F4, F3, F8, F6};
{F2, F5, F8, F4, F3, F1, F7, F6};
{F8, F5, F4, F7, F6, F3, F1, F2};
{F7, F4, F3, F6, F5, F2, F8, F1};
{F2, F6, F1, F4, F8, F7, F5, F3};
{F4, F1, F5, F6, F8, F2, F3, F7};
{F5, F8, F3, F7, F6, F4, F2, F1}; and
{F8, F6, F1, F7, F3, F5, F2, F4}.

If Q=8, the first sequence in S301A may be any one of the foregoing sequences, or the first sequence may be obtained by performing a cyclic shift on any one of the foregoing sequences.

It should be understood that the foregoing 42 sequences are merely some examples of sequences that may be formed by F1, F2, F3, F4, F5, F6, F7, and F8. Certainly, in actual application, F1, F2, F3, F4, F5, F6, F7, and F8 may further form other sequences. This is not limited in this application.

It should be understood that the foregoing is merely an example rather than a limitation. In specific implementation, a quantity of terminal devices in each terminal device group may alternatively be another quantity, and d may also have another value. This is not limited in this application.

"Collision" may be defined as that two terminal devices select a same frequency at a same transmission moment to transmit data. Table 1 shows frequency hopping patterns of 12 users (UE1 to UE12), where the users are divided into two groups: UE 1 to UE 6 are in one group and correspond to a sequence {F1, F2, F3, F4, F5, F6}, and UE 7 to UE 12 are in the other group and correspond to a sequence {F3, F1, F4, F6, F2, F5}. It can be learned from Table 1 that frequency hopping patterns of intra-group users are orthogonal to each other (that is, no collision occurs), and a maximum quantity of collisions of frequency hopping patterns of inter-group users does not exceed 2 (in Table 1, frequencies on which collisions occur between inter-group users are indicated by using italic and bold fonts).

TABLE 1

| User/Moment | UE 1 | UE 2 | UE 3 | UE 4 | UE 5 | UE 6 | UE 7 | UE 8 | UE 9 | UE 10 | UE 11 | UE 12 |
|---|---|---|---|---|---|---|---|---|---|---|---|---|
| T1 | F1 | F2 | F3 | F4 | F5 | F6 | F3 | F1 | F4 | F6 | F2 | F5 |
| T2 | F6 | F1 | F2 | F3 | F4 | F5 | F5 | F3 | F1 | F4 | F6 | F2 |
| T3 | F5 | F6 | F1 | F2 | F3 | F4 | F2 | F5 | F3 | F1 | F4 | F6 |
| T4 | F4 | F5 | F6 | F1 | F2 | F3 | F6 | F2 | F5 | F3 | F1 | F4 |
| T5 | F3 | F4 | F5 | F6 | F1 | F2 | F4 | F6 | F2 | F5 | F3 | F1 |
| T6 | F2 | F3 | F4 | F5 | F5 | F1 | F1 | F4 | F6 | F2 | F5 | F3 |

Based on this implementation, it can be ensured that frequency hopping patterns corresponding to any two terminal devices in a same terminal device group are orthogonal to each other, and a maximum quantity of collisions of frequency hopping patterns corresponding to any two terminal devices in different terminal device groups does not exceed d, thereby further improving reliability of a communication system.

In some embodiments, the candidate sequence may be specified in a protocol, or may be configured by the network device, or may be pre-agreed on by the network device and the terminal device. This is not limited in this application.

The following describes the three cases separately.

1. A protocol (for example, a 3GPP protocol) specifies several candidate sequences.

A quantity of same elements at a same relative position in any two sequences does not exceed a preset quantity d.

For example, the protocol specifies a first candidate sequence set, where the first candidate sequence set includes, for example, a plurality of candidate sequences in Example A. In some embodiments, each sequence corresponds to one index, as shown in Table 2.

TABLE 2

| First candidate sequence set | |
|---|---|
| Index | Sequence |
| 1 | {F1, F2, F3, F4, F5, F6} |
| 2 | {F3, F1, F4, F6, F2, F5} |
| 3 | {F2, F1, F3, F4, F6, F5} |
| 4 | {F3, F1, F2, F5, F6, F4} |
| 5 | {F4, F2, F6, F3, F5, F1} |
| 6 | {F5, F6, F2, F1, F4, F3} |
| 7 | {F6, F4, F1, F3, F5, F2} |

TABLE 2-continued

| First candidate sequence set | |
| --- | --- |
| Index | Sequence |
| 8 | {F2, F5, F4, F6, F1, F3} |
| 9 | {F6, F3, F1, F5, F2, F4} |
| 10 | {F3, F1, F6, F4, F5, F2} |
| 11 | {F1, F2, F3, F4, F5, F6} |
| 12 | {F3, F1, F4, F6, F2, F5} |
| 13 | {F2, F1, F3, F4, F6, F5} |
| 14 | {F3, F1, F2, F5, F6, F4} |
| 15 | {F4, F2, F6, F3, F5, F1} |
| 16 | {F5, F6, F2, F1, F4, F3} |
| 17 | {F6, F4, F1, F3, F5, F2} |
| 18 | {F2, F5, F4, F6, F1, F3} |
| 19 | {F6, F3, F1, F5, F2, F4} |
| 20 | {F3, F1, F6, F4, F5, F2} |

For example, the protocol specifies a second candidate sequence set, where the second candidate sequence set includes, for example, a plurality of candidate sequences in Example B. In some embodiments, each sequence corresponds to one index, as shown in Table 3.

TABLE 3

| Second candidate sequence set | | | |
| --- | --- | --- | --- |
| Index | Sequence | Index | Sequence |
| 1 | {F1, F2, F3, F4, F5, F6, F7, F8} | 22 | {F6, F1, F2, F7, F8, F3, F5, F4} |
| 2 | {F3, F5, F8, F1, F6, F7, F2, F4} | 23 | {F3, F8, F7, F2, F1, F6, F4, F5} |
| 3 | {F5, F1, F7, F2, F8, F4, F6, F3} | 24 | {F5, F2, F3, F6, F8, F7, F1, F4} |
| 4 | {F3, F7, F2, F5, F1, F8, F6, F4} | 25 | {F4, F1, F3, F7, F5, F8, F6, F2} |
| 5 | {F3, F1, F6, F5, F8, F7, F4, F2} | 26 | {F3, F8, F1, F4, F6, F5, F7, F2} |
| 6 | {F6, F4, F1, F8, F3, F2, F7, F5} | 37 | {F5, F3, F4, F2, F7, F6, F1, F8} |
| 7 | {F5, F7, F3, F1, F4, F2, F6, F8} | 28 | {F3, F2, F8, F6, F5, F1, F4, F7} |
| 8 | {F2, F7, F1, F5, F3, F6, F4, F8} | 29 | {F8, F2, F4, F5, F1, F6, F3, F7} |
| 9 | {F5, F4, F2, F8, F7, F3, F6, F1} | 30 | {F1, F8, F4, F7, F2, F6, F5, F3} |
| 10 | {F2, F8, F3, F1, F5, F7, F4, F6} | 31 | {F3, F4, F7, F1, F8, F2, F5, F6} |
| 11 | {F5, F7, F1, F2, F6, F3, F8, F4} | 32 | {F5, F7, F6, F8, F3, F4, F1, F2} |
| 12 | {F1, F3, F2, F4, F7, F8, F5, F6} | 33 | {F3, F2, F5, F4, F1, F7, F8, F6} |
| 13 | {F2, F5, F3, F7, F1, F6, F8, F4} | 34 | {F4, F5, F8, F2, F1, F3, F6, F7} |
| 14 | {F4, F3, F2, F1, F8, F7, F6, F5} | 35 | {F7, F5, F2, F1, F4, F3, F8, F6} |
| 15 | {F4, F1, F6, F2, F3, F5, F7, F8} | 36 | {F2, F5, F8, F4, F3, F1, F7, F6} |
| 16 | {F2, F6, F7, F1, F3, F4, F8, F5} | 37 | {F8, F5, F4, F7, F6, F3, F1, F2} |
| 17 | {F3, F6, F2, F1, F7, F5, F4, F8} | 38 | {F7, F4, F3, F6, F5, F2, F8, F1} |
| 18 | {F6, F8, F1, F5, F2, F7, F3, F4} | 39 | {F2, F6, F1, F4, F8, F7, F5, F3} |
| 19 | {F6, F2, F7, F4, F8, F1, F3, F5} | 40 | {F4, F1, F5, F6, F8, F2, F3, F7} |
| 20 | {F1, F2, F4, F6, F7, F3, F8, F5} | 41 | {F5, F8, F3, F7, F6, F4, F2, F1} |
| 21 | {F1, F3, F8, F2, F6, F4, F7, F5} | 42 | {F8, F6, F1, F7, F3, F5, F2, F4} |

Certainly, the first candidate sequence set and the second candidate sequence set may also be combined into one candidate sequence set. In this case, indexes of candidate sequences in Table 2 and Table 3 are not repeated, that is, one candidate sequence is uniquely determined based on one index.

In some embodiments, when the protocol specifies several candidate sequences, the network device may configure the first sequence and the first element for the first terminal device (or the network device configures the first frequency hopping pattern for the first terminal device), or the first terminal device randomly selects the first sequence and the first element (or the first terminal device randomly selects the first frequency hopping pattern). This is not limited in this application.

The following describes the two cases separately.

(1) When the protocol specifies several candidate sequences, the network device configures the first sequence and the first element for the first terminal device.

The network device determines, from a plurality of candidate sequences, one sequence as the first sequence (that is, a sequence corresponding to the first terminal device), and determines, from the first sequence, the first element corresponding to the first terminal device. The network device sends information about a first indication and information about a second indication to the first terminal device, where the first indication indicates the first sequence in the plurality of candidate sequences, and the second indication indicates the first element in the first sequence. The first terminal device receives the information about the first indication and the information about the second indication from the network device, determines the first sequence from the plurality of candidate sequences based on the first indication, and determines the first element from the first sequence based on the second indication.

The information about the first indication may be an index corresponding to the first sequence. For example, the candidate sequences specified in the protocol are the sequences shown in Table 2, and the first sequence is {F1, F2, F3, F4, F5, F6}. The network device may send, to the first terminal device, an index (that is, 1) corresponding to {F1, F2, F3, F4, F5, F6}. After receiving the index 1, the first terminal device may determine, according to the protocol, that the first sequence is {F1, F2, F3, F4, F5, F6}.

Alternatively, the information about the first indication is the first sequence. For example, the network device may directly send {F1, F2, F3, F4, F5, F6} to the first terminal device, and the first terminal device directly receives {F1, F2, F3, F4, F5, F6} from the network device.

The information about the second indication may be a sequence number of the first element in the first sequence. For example, the candidate sequences specified in the protocol are the sequences shown in Table 2, the first sequence is {F1, F2, F3, F4, F5, F6}, and the first element is F1. The network device may send, to the first terminal device, the index (that is, 1) corresponding to {F1, F2, F3, F4, F5, F6}, and a sequence number (for example, 1) of F1 in the first sequence.

Alternatively, the information about the second indication is the first element. For example, the network device may directly send F1 to the first terminal device.

In some embodiments, the information about the first indication and the information about the second indication may alternatively be carried in a same indication, for example, a third indication. For example, the third indication is a field in RCC signaling.

For example, the candidate sequences specified in the protocol are the sequences shown in Table 2. According to Table 2, there are 20×6=120 possible combinations of the first sequence and the first element of the first terminal device. The network device may number the 120 combinations. For example, 001 represents a combination of a sequence {F1, F2, F3, F4, F5, F6} and an element F1, 002 represents a combination of a sequence {F1, F2, F3, F4, F5, F6} and an element F2, . . . , 119 represents a combination of a sequence {F3, F1, F6, F4, F5, F2} and an element F5, and 120 represents a combination of a sequence {F3, F1, F6, F4, F5, F2} and an element F2. If the first sequence and the first element determined by the network device are {F1, F2, F3, F4, F5, F6} and F1 respectively, the network device may directly send the sequence number 001 to the first terminal device. After receiving the sequence number 001, the first terminal device may determine that the first sequence is {F1, F2, F3, F4, F5, F6}, and the first element is F1.

It should be understood that, according to the foregoing description, the first terminal device may obtain a plurality of frequency hopping patterns based on the first sequence, and may further determine, based on the first element, the first frequency hopping pattern corresponding to the first terminal device. Therefore, the foregoing process in which the network device configures the first sequence and the first element for the first terminal device may also be described as a process in which the network device configures the first frequency hopping pattern for the first terminal device. For example, the first sequence is {F1, F2, F3, F4}, the first sequence is F1, and one frequency hopping cycle includes four frequency hopping moments. The network device indicates {F1, F2, F3, F4} to the first terminal device, that is, the network device indicates four optional frequency hopping patterns (for example, F1, F2, F3, and F4; F2, F3, F4, and F1; F3, F4, F1, and F2; and F4, F1, F2, and F3) to the first terminal device. The network device indicates F1 to the first terminal device, that is, the network device indicates to the first terminal device that the first frequency hopping pattern is F1, F2, F3, and F4.

(2) When the protocol specifies several candidate sequences, the first terminal device may randomly select the first sequence and the first element.

For example, if the candidate sequences specified in the protocol are the candidate sequences shown in Table 2, the first terminal device may randomly select a sequence from the sequences shown in Table 2 as the first sequence, and then randomly select an element from the randomly selected sequence as the first element.

It should be understood that, that the first terminal device randomly selects the first sequence and the first element may also be described as a process in which the first terminal device randomly selects the first frequency hopping pattern. Details are not described herein again.

The foregoing two cases are merely examples rather than limitations. In specific implementation, there may be another implementation. For example, alternatively, the network device may first configure a plurality of candidate sequences for the first terminal device, and then the first terminal device randomly determines the first sequence and the first element from the plurality of candidate sequences configured by the network device. For example, if the candidate sequences specified in the protocol are the candidate sequences shown in Table 2. The network device may first broadcast 10 candidate sequences in Table 2, and then the first terminal device randomly selects a sequence from the 10 candidate sequences broadcast by the network device as the first sequence, and randomly selects an element from the randomly selected sequence as the first element.

In addition, in a scenario in which a plurality of candidate sequence sets are specified in the protocol, the network device may further dynamically select a candidate sequence set based on scenario parameters, and then determine, from the selected candidate sequence set, the first sequence and the first element that correspond to the first terminal device.

In some embodiments, the scenario parameters may include a quantity $N \leq \rho q$ of terminal devices that need to transmit data with the network device, a quantity q of frequencies that can be selected by the network device, and the like.

For example, the protocol specifies two candidate sequence sets shown in Table 2 and Table 3. Assuming that scenario parameters are N=60 and q=6, the network device may select the candidate sequence set shown in Table 2, divide 60 terminal devices (including the first terminal device) into 10 groups, where each group includes six terminal devices, configure a corresponding sequence for each terminal device group in Table 2, and indicate, to each terminal device, the first sequence corresponding to the terminal device and the first element corresponding to the terminal device in the first sequence.

The correspondence between the scenario parameter and the candidate sequence set may be generated by the network device, or may be agreed on in the protocol, or may be pre-agreed on by the network device and the terminal device. This is not limited in this application. When the correspondence between the scenario parameter and the candidate sequence set is independently generated by the network device, the network device further needs to notify the first terminal device of the correspondence or the candidate sequence set selected by the network device. When the correspondence between the scenario parameter and the candidate sequence set is agreed on in the protocol or pre-agreed on by the network device and the terminal device, the network device may skip notifying the first terminal device of the correspondence or the candidate sequence set selected by the network device; instead, the first terminal device determines the candidate sequence set based on the correspondence between the scenario parameter and the candidate sequence set (because the correspondence is fixed, the network device and the first terminal device may determine a consistent candidate sequence set based on a same scenario parameter).

Based on this implementation, the protocol specifies the candidate sequence, to reduce complexity of the communication system.

2. The network device generates the candidate sequence. A quantity of same elements at a same relative position in any two sequences does not exceed a preset quantity d.

In some embodiments, the network device may generate a candidate sequence set based on a scenario parameter (for example, a quantity $N \leq \rho q$ of terminal devices that need to transmit data with the network device, a quantity q of frequencies that can be selected by the network device).

For example, assuming that scenario parameters are N=120 and q=6, the network device divides 120 terminal devices (including the first terminal device) into 20 groups, where each group includes six terminal devices, and then generates 20 candidate sequences based on six optional frequencies. The 20 candidate sequences may be shown in Table 2, and are not described herein again.

When the network device generates the candidate sequence, the network device may configure the first sequence and the first element for the first terminal device. For example, the network device generates {F1, F2, F3, F4, F5, F6}, and then sends {F1, F2, F3, F4, F5, F6} to the first terminal device and indicates that the first element is F1. For a specific implementation in which the network device configures the first sequence and the first element for the first terminal device, refer to Case 1 for the specific implementation process in which the network device configures the first sequence and the first element for the first terminal device. Details are not described herein again.

Alternatively, the network device may generate several candidate sequences and send the several candidate sequences to the first terminal device, and the first terminal device randomly selects the first sequence and the first element from the several candidate sequences. For a specific implementation in which the first terminal device randomly selects the first sequence and the first element, refer to related descriptions in Case 1 about the specific implementation in which the first terminal device randomly selects the first sequence and the first element. Details are not described herein again.

It should be understood that a process in which the network device generates the candidate sequence may also be described as a process in which the network device generates a candidate frequency hopping pattern. Details are not described herein again.

Based on this implementation, the network device generates the candidate sequence, to improve communication flexibility.

3. The network device and the first terminal device agree on the candidate sequence. A quantity of same elements at a same relative position in any two sequences does not exceed a preset quantity d.

For example, the network device may generate at least one candidate sequence. Then the network device notifies the first terminal device of the generated at least one candidate sequence. After receiving the at least one candidate sequence, the first terminal device may send a response message to the network device, where the response message indicates that the first terminal device agrees to use the at least one candidate sequence. In this case, the network device and the first terminal device successfully agree on the candidate sequence.

For example, the first terminal device may generate at least one candidate sequence. Then the first terminal device reports the generated at least one candidate sequence to the network device. After receiving the at least one candidate sequence, the network device may send a response message to the first terminal device, where the response message indicates that the network device agrees to use the at least one candidate sequence. In this case, the network device and the first terminal device successfully agree on the candidate sequence.

Certainly, the foregoing two manners are merely examples rather than limitations. In actual application, the network device and the first terminal device may alternatively agree on the candidate sequence in another manner.

After the network device and the first terminal device successfully agree on the candidate sequence, the network device may configure the first sequence and the first element for the first terminal device based on the candidate sequence that is agreed on. For a specific implementation process, refer to Case 1 for the specific implementation process in which the network device configures the first sequence and the first element for the first terminal device based on the candidate sequence specified in the protocol. Details are not described herein again.

Alternatively, after the network device and the first terminal device successfully agree on the candidate sequence, the first terminal device may randomly select the first sequence and the first element from the candidate sequence that is agreed on. For a specific implementation process, refer to Case 1 for the specific implementation process in which the first terminal device randomly selects the first sequence and the first element from the candidate sequence specified in the protocol. Details are not described herein again.

It should be understood that a process in which the network device and the first terminal device agree on the candidate sequence may also be described as a process in which the first terminal device agrees on a candidate frequency hopping pattern. Details are not described herein again.

Based on this implementation, the network device and the first terminal device agree on the candidate sequence, to improve communication flexibility.

It may be understood that, to implement the functions in the foregoing embodiments, the network device and the terminal device include corresponding hardware structures and/or software modules for performing the functions. A person skilled in the art should be easily aware that, in combination with the units and the method steps in the examples described in embodiments disclosed in this application, this application can be implemented by using hardware or a combination of hardware and computer software. Whether a function is performed by using hardware or hardware driven by computer software depends on particular application scenarios and design constraints of the technical solutions.

FIG. 7 and FIG. 8 are schematic diagrams of structures of possible communication apparatuses according to embodiments of this application. The communication apparatuses may be configured to implement functions of the terminal device or the network device in the foregoing method embodiments. Therefore, beneficial effects of the foregoing method embodiments can also be achieved. The communication apparatus may be a terminal device, or may be a network device, or may be a module (for example, a chip) used in the terminal device or the network device.

As shown in FIG. 7, a communication apparatus 700 includes a processing unit 710 and an input/output unit 720. The communication apparatus 700 is configured to implement the functions of the terminal device or the network device in the foregoing method embodiments.

For example, when the communication apparatus 700 is configured to implement the functions of the terminal device in the foregoing method embodiments, the processing unit 710 is configured to obtain a first sequence, where the first sequence includes Q elements, the Q elements correspond to Q different frequencies, and Q is a positive integer greater than 1, and determine a first element in the first sequence. The input/output unit 720 is configured to perform data transmission with the network device in one frequency hopping cycle based on a frequency corresponding to an element in the first sequence, where the one frequency hopping cycle includes M frequency hopping moments, a frequency corresponding to the apparatus at a first frequency hopping moment is a frequency corresponding to the first element, a frequency corresponding to the apparatus at an $i^{th}$ frequency hopping moment is a frequency corresponding to an element obtained by cyclically moving from the first element leftward (or rightward) for i−1 times according to a specified rule, i is a positive integer from 2 to M, and M is a positive integer greater than or equal to 2.

In some embodiments, the processing unit 710 is configured to randomly select a sequence from a plurality of candidate sequences as the first sequence.

In some embodiments, the input/output unit 720 is further configured to receive information about a first indication from the network device, where the first indication indicates the first sequence in the plurality of candidate sequences; and the processing unit 710 is configured to determine, based on the first indication, a sequence from the plurality of candidate sequences as the first sequence.

In some embodiments, the input/output unit 720 is further configured to receive the first sequence from the network device; and the processing unit 710 is configured to obtain the first sequence from the input/output unit 720.

In some embodiments, the input/output unit 720 is further configured to receive information about a second indication from the network device, where the second indication indicates one of the Q elements in the first sequence; and the processing unit 710 is configured to determine, based on the second indication, one of the Q elements in the first sequence as the first element.

In some embodiments, the input/output unit 720 is further configured to receive a third indication from the network device, where the third indication includes the information about the first indication and the information about the second indication.

For more detailed descriptions about the processing unit 710 and the input/output unit 720, directly refer to related descriptions in the foregoing method embodiments. Details are not described herein again.

For example, when the communication apparatus 700 is configured to implement the functions of the network device in the foregoing method embodiments, the processing unit 710 is configured to obtain a first sequence, where the first sequence includes Q elements, the Q elements correspond to Q different frequencies, and Q is a positive integer greater than 1, and determine a first element in the first sequence. The input/output unit 720 is configured to perform data transmission with a first terminal device in one frequency hopping cycle based on a frequency corresponding to an element in the first sequence, where the one frequency hopping cycle includes M frequency hopping moments, a frequency corresponding to the first terminal device at a first frequency hopping moment is a frequency corresponding to the first element, a frequency corresponding to the first terminal device at an $i^{th}$ frequency hopping moment is a frequency corresponding to an element obtained by cyclically moving from the first element leftward (or rightward) for i−1 times according to a specified rule, i is a positive integer from 2 to M, and M is a positive integer greater than or equal to 2.

In some embodiments, the input/output unit 720 is further configured to send information about a first indication to the first terminal device, where the first indication indicates one sequence in the plurality of candidate sequences, or send the one sequence to the first terminal device.

In some embodiments, the input/output unit 720 is further configured to send information about a second indication to the terminal device, where the second indication indicates the first element in the Q elements in the first sequence.

In some embodiments, the input/output unit 720 is further configured to send a third indication to the first terminal device, where the third indication includes the information about the first indication and the information about the second indication.

For more detailed descriptions about the processing unit 710 and the input/output unit 720, directly refer to related descriptions in the foregoing method embodiments. Details are not described herein again.

As shown in FIG. 8, a communication apparatus 800 includes a processor 810 and an interface circuit 820. The processor 810 and the interface circuit 820 are coupled to each other. It may be understood that the interface circuit 820 may be a transceiver or an input/output interface.

In some embodiments, the communication apparatus 800 may further include a memory 830, configured to store instructions to be executed by the processor 810, store input data required for running the instructions by the processor 810, or store data generated after the processor 810 runs the instructions.

In some embodiments, in FIG. 8, the processor 810, the memory 830, and the interface circuit 820 are connected by using a bus, and the bus is represented by a bold line in FIG. 8. The bus may be classified into an address bus, a data bus, a control bus, and the like. For ease of representation, only one bold line is used to represent the bus in FIG. 8, but this does not mean that there is only one bus or only one type of bus.

In addition, the connection manner shown in FIG. 8 is merely an example for description, and is not limited thereto. In actual application, the memory 830 may be further deployed outside the apparatus 800, and is connected to the processor 810 through an interface, or the memory 830 may be integrated with the processor 810. This is not limited in this application.

When the communication apparatus 800 is configured to implement the method in the foregoing method embodiments, the processor 810 is configured to implement a function of the processing unit 710, and the interface circuit 820 is configured to implement a function of the input/output unit 720.

When the communication apparatus is a chip used in a terminal device, the chip in the terminal device implements a function of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a module used in a network device, the module in the network device implements a function of the network device in the foregoing method embodiments. The module in the network device receives information from another module (for example, a radio frequency module or an antenna) in the network device, where the information is sent by a terminal device to the network device. Alternatively, the module in the network device sends information to another module (for example, a radio frequency module or an antenna) in the network device, where the information is sent by the network device to a terminal device. The network device module herein may be a baseband chip of the network device, or may be a DU or another module. The DU herein may be a DU in an open radio access network (open radio access network, O-RAN) architecture.

It can be understood that the processor In some embodiments may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any regular processor.

The method steps in embodiments of this application may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a base station or a terminal. Certainly, the processor and the storage medium may exist in a base station or a terminal as discrete components.

The foregoing embodiments may be wholly or partially implemented by using software, hardware, firmware, or any combination thereof. When software is used to implement the embodiments, all or a part of the embodiments may be implemented in a form of a computer program product. The computer program product includes one or more computer programs and instructions. When the computer programs or instructions are loaded and executed on a computer, all or some of the processes or functions in embodiments of this application are executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium that can be accessed by a computer, or a data storage device, such as a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid state disk. The computer-readable storage medium may be a volatile or non-volatile storage medium, or may include two types of storage media: a volatile storage medium and a non-volatile storage medium.

In embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

In this application, "at least one" means one or more, and "a plurality of" means two or more. "And/or" describes an association relationship between associated objects and indicates that three relationships may exist. For example, A and/or B may indicate the following three cases: Only A exists, both A and B exist, and only B exists, where A and B may be singular or plural. In the text descriptions of this application, the character "/" generally indicates an "or" relationship between the associated objects. In a formula in this application, the character "/" indicates a "division" relationship between the associated objects. "Including at least one of A, B, and C" may indicate: including A; including B; including C; including A and B; including A and C; including B and C; and including A, B, and C.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first priority criterion and a second priority criterion are merely used to distinguish between different criteria, but do not indicate different content, priorities, importance, or the like of the two criteria.

In addition, terms "include" and "have" in embodiments, claims, and accompanying drawings of this application are not exclusive. For example, a process, a method, a system, a product, or a device including a series of steps or modules is not limited to listed steps or modules, and may further include steps or modules that are not listed.

It may be understood that numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

A person skilled in the art should understand that embodiments of this application may be provided as a method, a system, or a computer program product. Therefore, this application may use a form of hardware-only embodiments, software-only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clearly that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A data transmission method, comprising:

obtaining, a first sequence, wherein the first sequence comprises Q elements, and the Q elements correspond to Q different frequencies, where Q is a positive integer greater than 1;

determining a first element in the first sequence; and performing data transmission with a network device in one frequency hopping cycle based on a frequency corresponding to an element in the first sequence, wherein the one frequency hopping cycle comprises M frequency hopping moments, a first frequency corresponding to a first terminal device at a first frequency hopping moment of the M frequency hopping moments is a frequency corresponding to the first element, a second frequency corresponding to the first terminal device at an $i^{th}$ frequency hopping moment of the M frequency hopping moments is a frequency corresponding to a second element obtained by cyclically moving from the first element in a left direction or a right direction for i−1 times according to a specified rule, the left direction being opposite from the right direction, where i is a positive integer from 2 to M, and M is a positive integer greater than or equal to 2.

2. The method according to claim 1, wherein the first sequence is one of a plurality of candidate sequences, the plurality of candidate sequences are in a one-to-one correspondence with a plurality of terminal device groups, the first terminal device is located in a first terminal device group in the plurality of terminal device groups, and a quantity of same elements at a same relative position in two sequences in the plurality of candidate sequences does not exceed a preset quantity; and the method further comprises: performing, by a second terminal device, in the one frequency hopping cycle, data transmission with the network device based on a frequency corresponding to an element in a second sequence, wherein the second sequence is a sequence in the plurality of candidate sequences other than the first sequence, the second terminal device is located in a second terminal device group in the plurality of terminal device groups, and the second terminal device group is different from the first terminal device group.

3. The method according to claim 1, wherein the specified rule comprises:

starting from the first element, and each element is cyclically moved in the left direction or the right direction in turn.

4. The method according to claim 1, wherein the obtaining the first sequence comprises:

randomly selecting one sequence in a plurality of candidate sequences as the first sequence;

receiving first information about a first indication from the network device, wherein the first indication is usable to indicate the one sequence in the plurality of candidate sequences; and determining the one sequence in the plurality of candidate sequences as the first sequence based on the first indication; or receiving the first sequence from the network device, wherein the first sequence is one of the plurality of candidate sequences.

5. The method according to claim 4, wherein the plurality of candidate sequences are specified in a protocol;

the plurality of candidate sequences are configured by the network device; or the plurality of candidate sequences are pre-agreed by the network device and the first terminal device.

6. The method according to claim 4, wherein the determining the first element in the first sequence comprises:

receiving second information about a second indication from the network device, wherein the second indication is usable to indicate one element in the Q elements in the first sequence; and determining, from the Q elements in the first sequence, the one element as the first element based on the second indication.

7. The method according to claim 6, further comprising:

receiving a third indication from the network device, wherein the third indication comprises the first information about the first indication and the second information about the second indication.

8. The method according to claim 1, wherein Q=6, and the first sequence is one of the following sequences, or is obtained by performing cyclic shifts on the one of the following sequences:

{F1, F2, F3, F4, F5, F6};
{F3, F1, F4, F6, F2, F5};
{F2, F1, F3, F4, F6, F5};
{F3, F1, F2, F5, F6, F4};
{F4, F2, F6, F3, F5, F1};
{F5, F6, F2, F1, F4, F3};
{F6, F4, F1, F3, F5, F2};
{F2, F5, F4, F6, F1, F3};
{F6, F3, F1, F5, F2, F4};
{F3, F1, F6, F4, F5, F2};
{F3, F6, F4, F2, F5, F1};
{F2, F1, F5, F6, F3, F4};
{F4, F5, F1, F6, F3, F2};
{F4, F1, F6, F2, F3, F5};
{F5, F3, F4, F1, F2, F6};
{F4, F1, F5, F3, F6, F2};
{F5, F4, F3, F2, F1, F6};
{F1, F2, F4, F3, F6, F5};
{F5, F4, F2, F3, F6, F1}; and
{F2, F6, F1, F4, F5, F3}, where F1, F2, F3, F4, F5, and F6 represent six different frequencies.

9. The method according to claim 1, wherein Q=8, and the first sequence is one of the following sequences, or is obtained by performing cyclic shifts on the one of the following sequences:

{F1, F2, F3, F4, F5, F6, F7, F8};
{F3, F5, F8, F1, F6, F7, F2, F4};
{F5, F1, F7, F2, F8, F4, F6, F3};
{F3, F7, F2, F5, F1, F8, F6, F4};
{F3, F1, F6, F5, F8, F7, F4, F2};
{F6, F4, F1, F8, F3, F2, F7, F5};
{F5, F7, F3, F1, F4, F2, F6, F8};
{F2, F7, F1, F5, F3, F6, F4, F8};
{F5, F4, F2, F8, F7, F3, F6, F1};
{F2, F8, F3, F1, F5, F7, F4, F6};
{F5, F7, F1, F2, F6, F3, F8, F4};
{F1, F3, F2, F4, F7, F8, F5, F6};
{F2, F5, F3, F7, F1, F6, F8, F4};
{F4, F3, F2, F1, F8, F7, F6, F5};
{F4, F1, F6, F2, F3, F5, F7, F8};
{F2, F6, F7, F1, F3, F4, F8, F5};
{F3, F6, F2, F1, F7, F5, F4, F8};
{F6, F8, F1, F5, F2, F7, F3, F4};
{F6, F2, F7, F4, F8, F1, F3, F5};
{F1, F2, F4, F6, F7, F3, F8, F5};
{F1, F3, F8, F2, F6, F4, F7, F5};
{F6, F1, F2, F7, F8, F3, F5, F4};
{F3, F8, F7, F2, F1, F6, F4, F5};
{F5, F2, F3, F6, F8, F7, F1, F4};
{F4, F1, F3, F7, F5, F8, F6, F2};
{F3, F8, F1, F4, F6, F5, F7, F2};
{F5, F3, F4, F2, F7, F6, F1, F8};
{F3, F2, F8, F6, F5, F1, F4, F7};
{F8, F2, F4, F5, F1, F6, F3, F7};
{F1, F8, F4, F7, F2, F6, F5, F3};
{F3, F4, F7, F1, F8, F2, F5, F6};
{F5, F7, F6, F8, F3, F4, F1, F2};
{F3, F2, F5, F4, F1, F7, F8, F6};
{F4, F5, F8, F2, F1, F3, F6, F7};
{F7, F5, F2, F1, F4, F3, F8, F6};
{F2, F5, F8, F4, F3, F1, F7, F6};
{F8, F5, F4, F7, F6, F3, F1, F2};
{F7, F4, F3, F6, F5, F2, F8, F1};
{F2, F6, F1, F4, F8, F7, F5, F3};
{F4, F1, F5, F6, F8, F2, F3, F7};
{F5, F8, F3, F7, F6, F4, F2, F1}; and
{F8, F6, F1, F7, F3, F5, F2, F4},
where F1, F2, F3, F4, F5, F6, F7, and F8 represent eight different frequencies.

10. A frequency hopping transmission method, comprising:

obtaining a first sequence, wherein the first sequence comprises Q elements, and the Q elements correspond to Q different frequencies, where Q is a positive integer greater than 1;

determining a first element in the first sequence; and performing data transmission with a first terminal device in one frequency hopping cycle based on a frequency corresponding to an element in the first sequence, wherein the one frequency hopping cycle comprises M frequency hopping moments, a first frequency corresponding to the first terminal device at a first frequency hopping moment of the M frequency hopping moments is a frequency corresponding to the first element, a second frequency corresponding to the first terminal device at an i$^{th}$ frequency hopping moment of the M frequency hopping moments is a frequency corresponding to a second element obtained by cyclically moving from the first element in a left direction or a right direction for i−1 times according to a specified rule, the left direction being opposite from the right direction, where i is a positive integer from 2 to M, and M is a positive integer greater than or equal to 2.

11. The method according to claim 10, wherein the first sequence is one of a plurality of candidate sequences, the plurality of candidate sequences are in a one-to-one correspondence with a plurality of terminal device groups, the first terminal device is located in a first terminal device group in the plurality of terminal device groups, and a quantity of same elements at a same relative position in two sequences in the plurality of candidate sequences does not exceed a preset quantity; and the method further comprises: performing, by a network device, in the one frequency hopping cycle, data transmission with a second terminal device based on a frequency corresponding to an element in a second sequence, wherein the second sequence is a sequence in the plurality of candidate sequences other than the first sequence, the second terminal device is located in a second terminal device group in the plurality of terminal device groups, and the second terminal device group is different from the first terminal device group.

12. The method according to claim 10, wherein the specified rule comprises:

starting from the first element, and each element is cyclically moved in the left direction or the right direction in turn.

13. The method according to claim 10, wherein the obtaining the first sequence comprises:

determining one sequence in the plurality of candidate sequences as the first sequence; and the method further comprises:

sending first information about a first indication to the first terminal device, wherein the first indication is usable to indicate the one sequence in the plurality of candidate sequences; or sending the one sequence to the first terminal device.

14. The method according to claim 13, wherein the plurality of candidate sequences are specified in a protocol;

the plurality of candidate sequences are configured; or the plurality of candidate sequences are pre-agreed by a network device and the first terminal device.

15. The method according to claim 13, wherein the method further comprises:

sending second information about a second indication to the first terminal device, wherein the second indication is usable to indicate the first element in the Q elements in the first sequence.

16. The method according to claim 15, wherein the method further comprises:

sending a third indication to the first terminal device, wherein the third indication comprises the first information about the first indication and the second information about the second indication.

17. The method according to claim 10, wherein Q=6, and the first sequence is one of the following sequences, or is obtained by performing cyclic shifts on the one of the following sequences:

{F1, F2, F3, F4, F5, F6};
{F3, F1, F4, F6, F2, F5};
{F2, F1, F3, F4, F6, F5};
{F3, F1, F2, F5, F6, F4};
{F4, F2, F6, F3, F5, F1};

{F5, F6, F2, F1, F4, F3};
{F6, F4, F1, F3, F5, F2};
{F2, F5, F4, F6, F1, F3};
{F6, F3, F1, F5, F2, F4};
{F3, F1, F6, F4, F5, F2};
{F3, F6, F4, F2, F5, F1};
{F2, F1, F5, F6, F3, F4};
{F4, F5, F1, F6, F3, F2};
{F4, F1, F6, F2, F3, F5};
{F5, F3, F4, F1, F2, F6};
{F4, F1, F5, F3, F6, F2};
{F5, F4, F3, F2, F1, F6};
{F1, F2, F4, F3, F6, F5};
{F5, F4, F2, F3, F6, F1}; and
{F2, F6, F1, F4, F5, F3},
where F1, F2, F3, F4, F5, and F6 represent six different frequencies.

18. The method according to claim 10, wherein Q=8, and the first sequence is one of the following sequences, or is obtained by performing cyclic shifts on the one of the following sequences:
{F1, F2, F3, F4, F5, F6, F7, F8};
{F3, F5, F8, F1, F6, F7, F2, F4};
{F5, F1, F7, F2, F8, F4, F6, F3};
{F3, F7, F2, F5, F1, F8, F6, F4};
{F3, F1, F6, F5, F8, F7, F4, F2};
{F6, F4, F1, F8, F3, F2, F7, F5};
{F5, F7, F3, F1, F4, F2, F6, F8};
{F2, F7, F1, F5, F3, F6, F4, F8};
{F5, F4, F2, F8, F7, F3, F6, F1};
{F2, F8, F3, F1, F5, F7, F4, F6};
{F5, F7, F1, F2, F6, F3, F8, F4};
{F1, F3, F2, F4, F7, F8, F5, F6};
{F2, F5, F3, F7, F1, F6, F8, F4};
{F4, F3, F2, F1, F8, F7, F6, F5};
{F4, F1, F6, F2, F3, F5, F7, F8};
{F2, F6, F7, F1, F3, F4, F8, F5};
{F3, F6, F2, F1, F7, F5, F4, F8};
{F6, F8, F1, F5, F2, F7, F3, F4};
{F6, F2, F7, F4, F8, F1, F3, F5};
{F1, F2, F4, F6, F7, F3, F8, F5};
{F1, F3, F8, F2, F6, F4, F7, F5};
{F6, F1, F2, F7, F8, F3, F5, F4};
{F3, F8, F7, F2, F1, F6, F4, F5};
{F5, F2, F3, F6, F8, F7, F1, F4};
{F4, F1, F3, F7, F5, F8, F6, F2};
{F3, F8, F1, F4, F6, F5, F7, F2};
{F5, F3, F4, F2, F7, F6, F1, F8};
{F3, F2, F8, F6, F5, F1, F4, F7};
{F8, F2, F4, F5, F1, F6, F3, F7};
{F1, F8, F4, F7, F2, F6, F5, F3};
{F3, F4, F7, F1, F8, F2, F5, F6};
{F5, F7, F6, F8, F3, F4, F1, F2};
{F3, F2, F5, F4, F1, F7, F8, F6};
{F4, F5, F8, F2, F1, F3, F6, F7};
{F7, F5, F2, F1, F4, F3, F8, F6};
{F2, F5, F8, F4, F3, F1, F7, F6};
{F8, F5, F4, F7, F6, F3, F1, F2};
{F7, F4, F3, F6, F5, F2, F8, F1};
{F2, F6, F1, F4, F8, F7, F5, F3};
{F4, F1, F5, F6, F8, F2, F3, F7};
{F5, F8, F3, F7, F6, F4, F2, F1}; and
{F8, F6, F1, F7, F3, F5, F2, F4},
where F1, F2, F3, F4, F5, F6, F7, and F8 represent eight different frequencies.

19. A communication apparatus, comprising at least one processor and at least one memory, wherein the at least one memory is configured to store non-transitory instructions, and in response to the at least one processor being configured to execute the non-transitory instructions thereby causing the communication apparatus to:
obtain a first sequence, wherein the first sequence comprises Q elements, and the Q elements correspond to Q different frequencies, where Q is a positive integer greater than 1;
determine a first element in the first sequence; and
perform data transmission with a network device in one frequency hopping cycle based on a frequency corresponding to an element in the first sequence,
wherein the one frequency hopping cycle comprises M frequency hopping moments,
a first frequency corresponding to the apparatus at a first frequency hopping moment of the M frequency hopping moments is a frequency corresponding to the first element,
a second frequency corresponding to the apparatus at an $i^{th}$ frequency hopping moment of the M frequency hopping moments is a frequency corresponding to an element obtained by cyclically moving from the first element in a left direction or a right direction for i−1 times according to a specified rule, the left direction being opposite from the right direction, where i is a positive integer from 2 to M, and M is a positive integer greater than or equal to 2.

20. The communication apparatus according to claim 19, wherein the first sequence is one of a plurality of candidate sequences, the plurality of candidate sequences are in a one-to-one correspondence with a plurality of terminal device groups, the communication apparatus is located in a first terminal device group in the plurality of terminal device groups, and a quantity of same elements at a same relative position in two sequences in the plurality of candidate sequences does not exceed a preset quantity; and
the at least one processor being further configured to execute the non-transitory instructions thereby further causing the communication apparatus to: perform, in the one frequency hopping cycle, data transmission with the network device based on a frequency corresponding to an element in a second sequence, wherein the second sequence is a sequence in the plurality of candidate sequences other than the first sequence, the second terminal device is located in a second terminal device group in the plurality of terminal device groups, and the second terminal device group is different from the first terminal device group.

* * * * *